United States Patent
Inoue et al.

(10) Patent No.: US 9,755,888 B2
(45) Date of Patent: Sep. 5, 2017

(54) INFORMATION PROCESSING DEVICE, INFORMATION PROCESSING SYSTEM, AND COMMUNICATION DEVICE

(71) Applicant: FUJITSU LIMITED, Kawasaki-shi, Kanagawa (JP)

(72) Inventors: Tomohiro Inoue, Kawasaki (JP); Shun Ando, Yokohama (JP); Shinya Hiramoto, Yokohama (JP); Masahiro Maeda, Zama (JP); Masao Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 14/884,142

(22) Filed: Oct. 15, 2015

(65) Prior Publication Data
US 2016/0112251 A1 Apr. 21, 2016

(30) Foreign Application Priority Data

Oct. 20, 2014 (JP) ................. 2014-213842

(51) Int. Cl.
*H04L 12/24* (2006.01)
*H04L 12/931* (2013.01)
(Continued)

(52) U.S. Cl.
CPC .......... *H04L 41/0672* (2013.01); *H04L 1/16* (2013.01); *H04L 1/20* (2013.01); *H04L 5/0044* (2013.01);
(Continued)

(58) Field of Classification Search
CPC ..... H04L 41/0672; H04L 5/0044; H04L 1/16; H04L 1/20; H04L 47/13; H04L 49/352; H04L 1/08
See application file for complete search history.

(56) References Cited

U.S. PATENT DOCUMENTS

| 2010/0162033 A1* | 6/2010 | Ahn ..................... G06F 11/2007 714/4.1 |
| 2010/0246389 A1 | 9/2010 | Toyoda et al. |

(Continued)

FOREIGN PATENT DOCUMENTS

| EP | 2 924 583 A1 | 9/2015 |
| JP | 2011-123798 | 6/2011 |
| WO | 2013/145240 A1 | 10/2013 |

OTHER PUBLICATIONS

Kanbe et al., "Lane Degeneration Technology for 100 Gbit Ethernet", IEICE Technical Report CS2010-39, pp. 13-18, Abstract, Nov. 2010.

*Primary Examiner* — Charles C Jiang
*Assistant Examiner* — Thad Defauw
(74) *Attorney, Agent, or Firm* — Staas & Halsey LLP

(57) ABSTRACT

An information processing device includes a transfer unit and an interface unit, the interface unit distributes transmission to a plurality of first lanes, and generate reception information from a plurality of pieces of distribution reception data received through a plurality of second lanes, the transfer unit includes a reception processing unit to extract reception data included in the reception information, and first error information indicating an error in any of the first lanes and a degeneration management unit to generate first degeneration information indicating a use stop lane among the first lanes, based on the first error information, generate second degeneration information indicating a use stop lane among the plurality of second lanes, based on second error information that is output from the interface unit, and cause the transmission processing unit to generate transmission information including the second degeneration information.

10 Claims, 21 Drawing Sheets

(51) Int. Cl.
*H04L 12/801* (2013.01)
*H04L 1/16* (2006.01)
*H04L 1/20* (2006.01)
*H04L 5/00* (2006.01)
*H04L 1/08* (2006.01)

(52) U.S. Cl.
CPC ............ *H04L 47/13* (2013.01); *H04L 49/352* (2013.01); *H04L 1/08* (2013.01)

(56) References Cited

U.S. PATENT DOCUMENTS

| | | | |
|---|---|---|---|
| 2011/0141883 A1* | 6/2011 | Kim | H04L 41/0833 370/225 |
| 2014/0078894 A1* | 3/2014 | Han | H04L 41/0677 370/228 |
| 2015/0012774 A1 | 1/2015 | Maeda et al. | |

* cited by examiner

FIG. 7

| No. | LINK-UP STATE | TRIGGER FOR LANE DEGRADATION |
|---|---|---|
| 1 | PRIOR TO LINK-UP | DETECTION OF LANE FAILURE |
| 2 | AFTER LINK-UP | DETERIORATION IN BIT ERROR RATE<br>(THE NUMBER OF RETRANSMISSIONS<br>WITHIN UNIT TIME EXCEEDS THRESHOLD) |
| 3 | AFTER LINK-UP | DETECTION OF RETRY-OUT<br>(THE NUMBER OF CONTINUOUS RETRANSMISSIONS EXCEEDS<br>A THRESHOLD, AND TIMEOUT OF RECEPTION OF ACK/NACK) |
| 4 | AFTER LINK-UP | DETECTION OF FLOW CONTROL PROTOCOL ERROR<br>(PERIOD OF NOT RECEIVING FLOW<br>CONTROL FRAME EXCEEDS THRESHOLD) |
| 5 | AFTER LINK-UP | THE NUMBER OF BIP ERRORS WITHIN<br>PREDETERMINED PERIOD EXCEEDS THRESHOLD |
| 6 | PRIOR TO LINK-UP<br>OR AFTER LINK-UP | SWITCHING FROM NORMAL OPERATION<br>MODE TO LOW POWER MODE |

| No. | LINK-UP STATE | TRIGGER FOR RELEASING LANE DEGRADATION |
|---|---|---|
| 1 | PRIOR TO LINK-UP<br>OR AFTER LINK-UP | SWITCHING FROM LOW POWER<br>MODE TO NORMAL OPERATION MODE |

FIG. 9

| PCS LANE | DETECTION/ NON-DETECTION OF ALIGNMENT MARKER | PHYSICAL LANE | THE NUMBER OF PCS LANES FOR WHICH ALIGNMENT MARKER IS DETECTED | SPECIFICATION RESULT |
|---|---|---|---|---|
| PLr0 | DETECTION | PHLr0 | 5 | NORMAL |
| PLr1 | DETECTION | | | |
| PLr2 | DETECTION | | | |
| PLr3 | DETECTION | | | |
| PLr4 | DETECTION | | | |
| PLr5 ⋮ PLr9 | DETECTION ⋮ DETECTION | PHLr1 | 5 | NORMAL |
| PLr10 ⋮ PLr14 | DETECTION ⋮ DETECTION | PHLr2 | 5 | NORMAL |
| PLr15 | DETECTION | PHLr3 | 4 | DEGRADATION TARGET |
| PLr16 | NON-DETECTION | | | |
| PLr17 | DETECTION | | | |
| PLr18 | DETECTION | | | |
| PLr19 | DETECTION | | | |

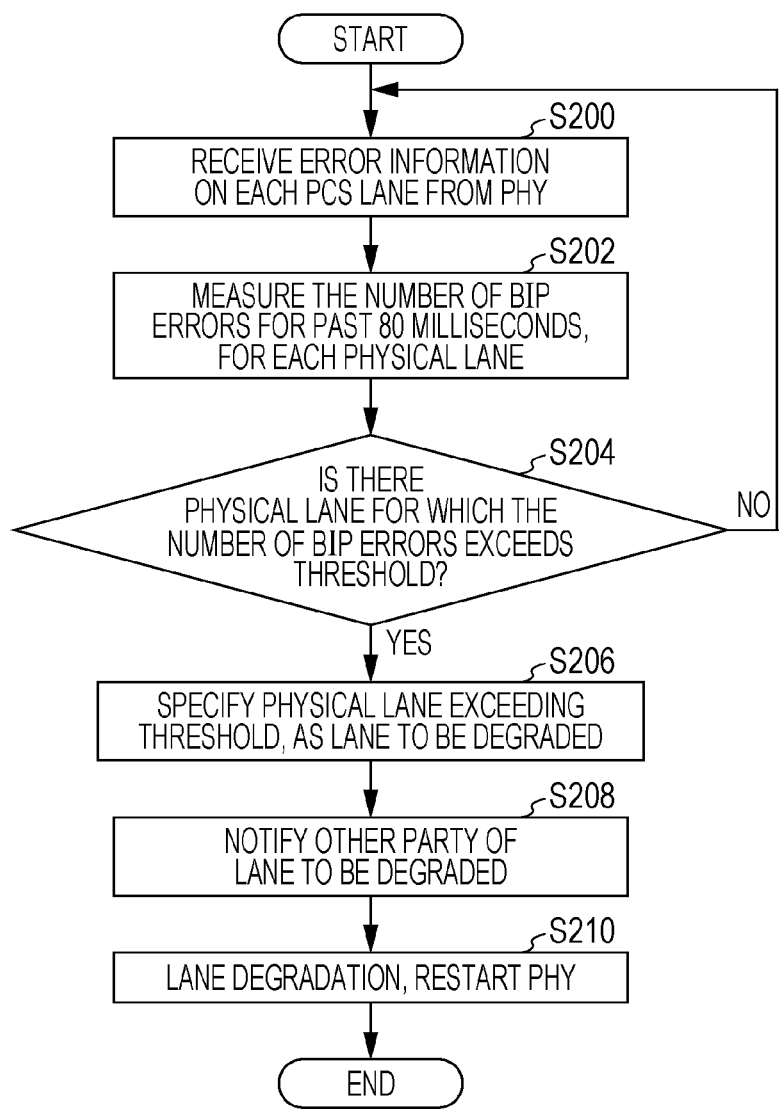

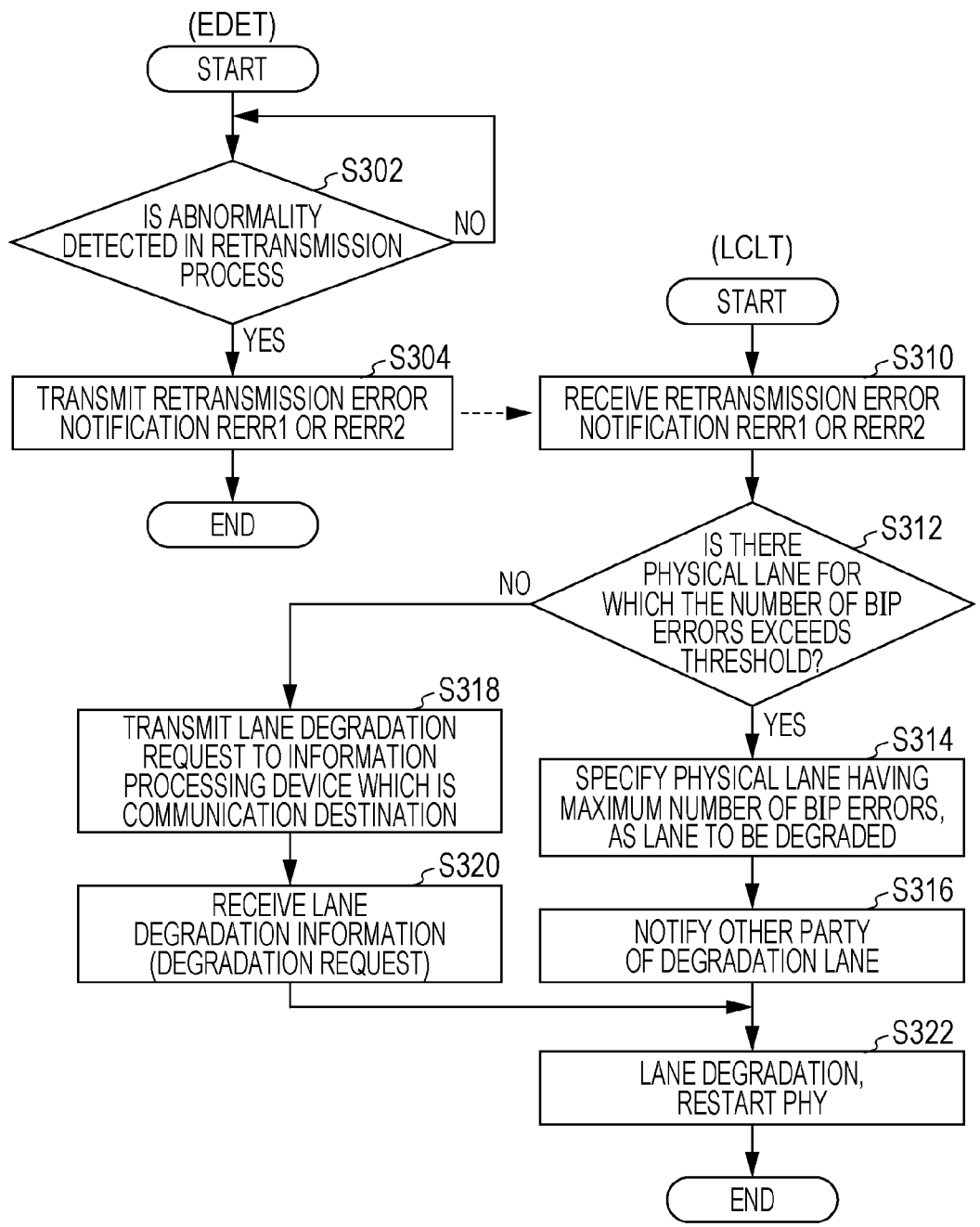

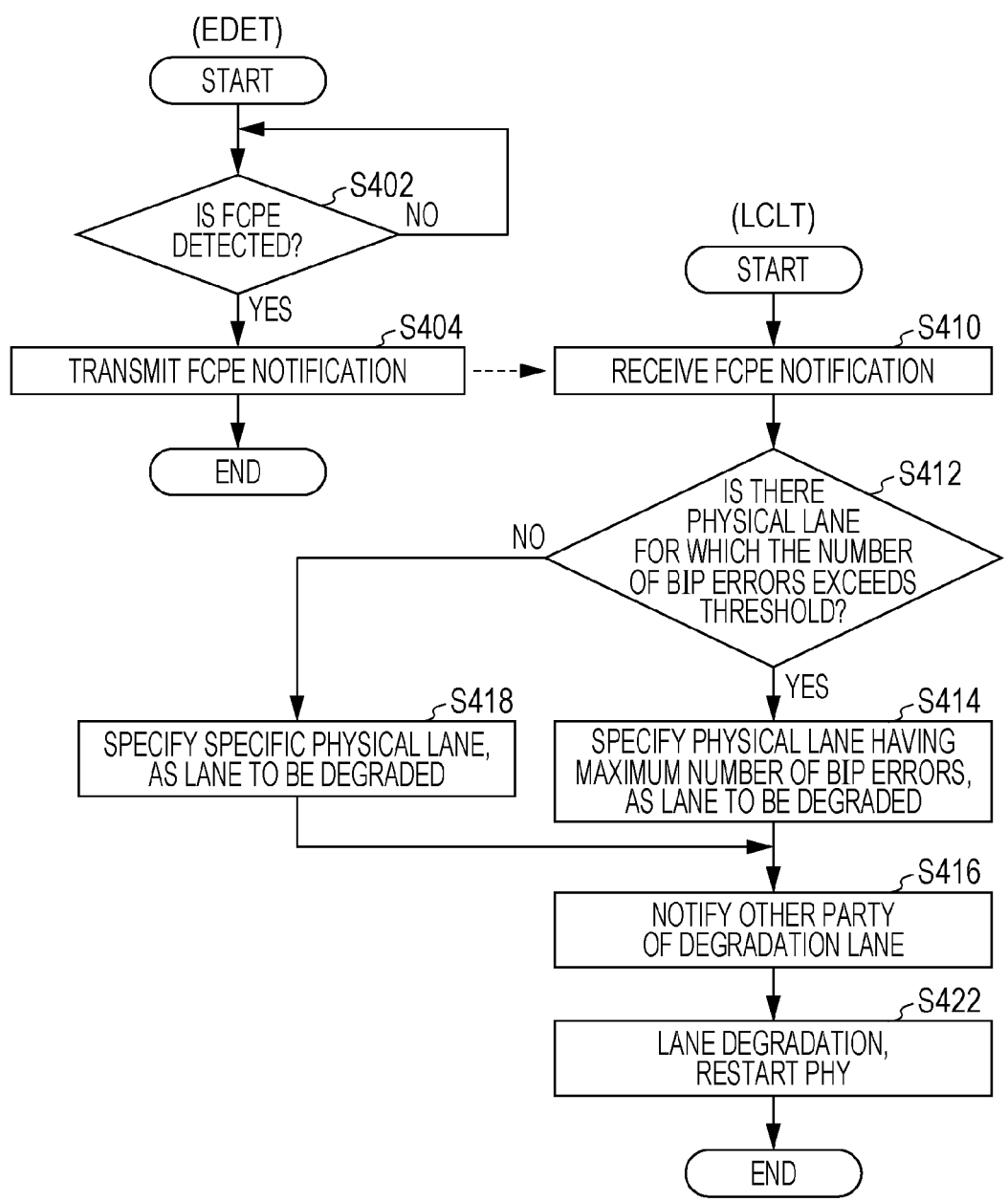

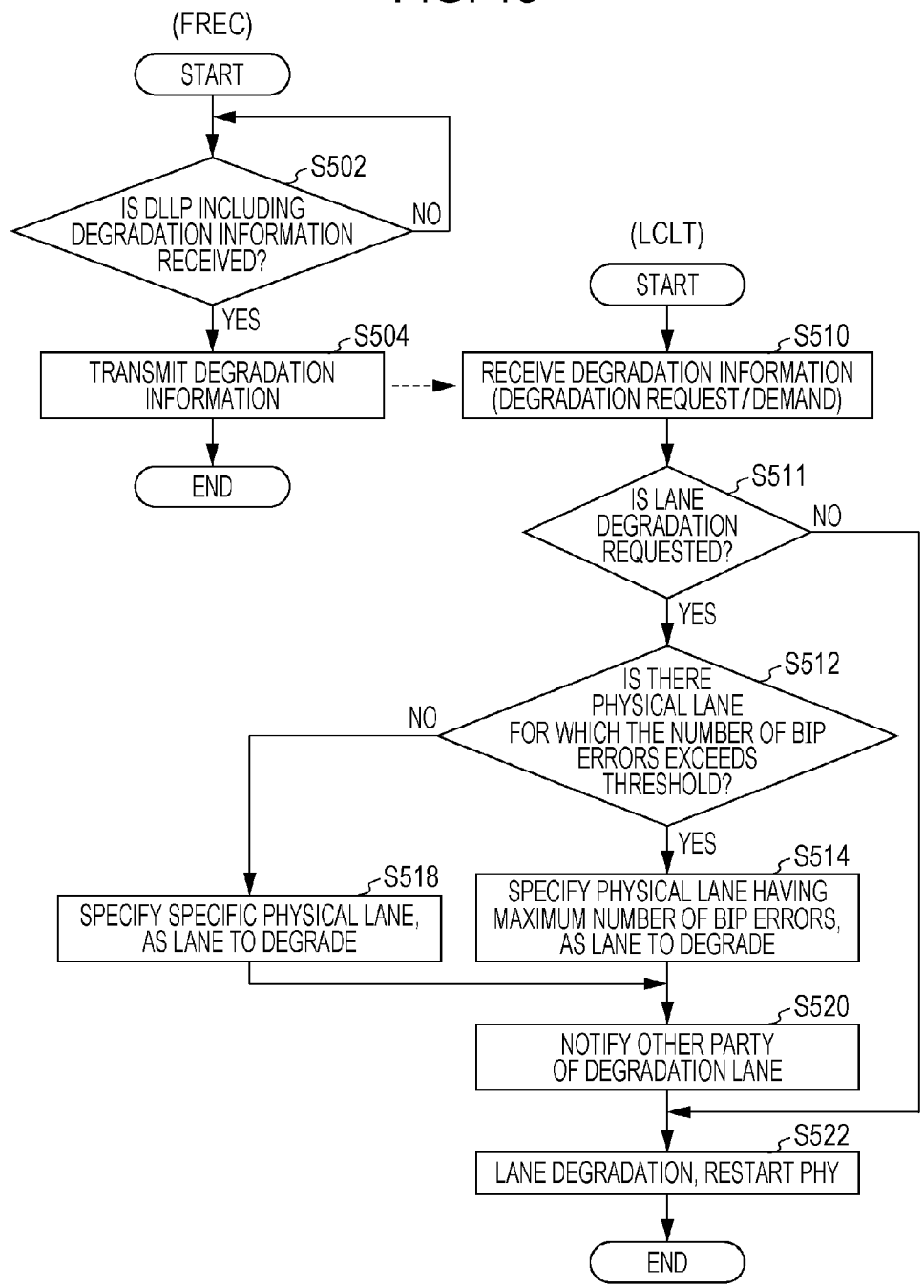

FIG. 14

| PCS LANE | BIP ERROR | PHYSICAL LANE | THE NUMBER OF BIP ERRORS WITHIN PREDETERMINED PERIOD (THRESHOLD: 3) | MEASUREMENT RESULT (FIG. 10) | MEASUREMENT RESULT (FIGS. 11 TO 13) |
|---|---|---|---|---|---|
| PLr0 | PRESENCE | PHLr0 | 5 | DEGRADATION TARGET | DEGRADATION TARGET |
| PLr1 | ABSENCE | | | | |
| PLr2 | ABSENCE | | | | |
| PLr3 | ABSENCE | | | | |
| PLr4 | ABSENCE | | | | |
| PLr5 | ABSENCE | PHLr1 | 1 | NORMAL | NORMAL |
| ⋮ | ⋮ | | | | |
| PLr9 | ABSENCE | | | | |
| PLr10 | ABSENCE | PHLr2 | 2 | NORMAL | NORMAL |
| ⋮ | ⋮ | | | | |
| PLr14 | ABSENCE | | | | |
| PLr15 | PRESENCE | PHLr3 | 4 | DEGRADATION TARGET | NORMAL |
| PLr16 | ABSENCE | | | | |
| PLr17 | ABSENCE | | | | |
| PLr18 | ABSENCE | | | | |
| PLr19 | ABSENCE | | | | |

INFORMATION PROCESSING DEVICE, INFORMATION PROCESSING SYSTEM, AND COMMUNICATION DEVICE

CROSS-REFERENCE TO RELATED APPLICATION

This application is based upon and claims the benefit of priority of the prior Japanese Patent Application No. 2014-213842, filed on Oct. 20, 2014, the entire contents of which are incorporated herein by reference.

FIELD

The embodiment discussed herein is related to an information processing device, an information processing system, and a communication device.

BACKGROUND

An information processing system such as a parallel computer system includes a plurality of information processing devices which are connected through a lane which is a data transmission path. For example, an information processing device using Ethernet (registered trademark) of 100 Gbps, which is defined in IEEE802.3ba standard, transmits data to an information processing device of a communication destination through a link including a plurality of lanes. Hereinafter, Ethernet of 100 Gbps is referred to as 100 Gb Ethernet. In the standard specification of 100 Gb Ethernet, an alignment marker is inserted between data blocks for each lane in order to detect skew between data lanes and detect data errors.

The physical layer of the IEEE802.3ba standard does not have a function of specifying a failed lane and a function of causing a lane to be degenerated. Therefore, if one lane among a plurality of lanes is failed, the link is disconnected and thus the reliability of the parallel computer system is reduced.

A so-called lane degeneration method (also known as degradation method) has been proposed in which a failed lane is disabled and data is transmitted using a lane operating normally in order to suppress the deterioration of the reliability of the parallel computer system (for example, see Akihiro Kanbe, Masashi Kono, and Hidehiro Toyoda, "Lane Degeneration Technology for 100 Gbit Ethernet", IEICE Technical Report CS2010-39, pp. 13-18, November 2010). For example, lane degeneration is realized by inserting a switching control marker for controlling the switching of a lane at a position different from the position of the alignment marker between data blocks.

Further, a method has been proposed which suppresses power consumption by changing the number of lanes for transferring data based on the number of requests per unit time, in a data transfer system that transfers data using a plurality of lanes (for example, see Japanese Laid-open Patent Publication No. 2011-123798).

However, in the technology of inserting a switching control marker at a position different from the position of the alignment marker, it is difficult to adopt this technology in the physical layer protocol conforming to IEEE802.3ba standards. Therefore, in this type of system, the physical layer protocol is changed, and a circuit block for realizing a physical layer is newly designed according to the modified protocol.

In an aspect, an object is to provide an information processing device, an information processing system, and a communication device that detect a failure in a lane and cause the failed lane to be degenerated, even when an interface unit that inputs and outputs data to a lane is an interface unit in which a degeneration control function is not defined in a protocol or a data format.

SUMMARY

According to an aspect of the invention, an information processing device includes a transfer unit and an interface unit, the interface unit distributes transmission to a plurality of first lanes, and generate reception information from a plurality of pieces of distribution reception data received through a plurality of second lanes, the transfer unit includes a reception processing unit to extract reception data included in the reception information, and first error information indicating an error in any of the first lanes and a degeneration management unit to generate first degeneration information indicating a use stop lane among the first lanes, based on the first error information, generate second degeneration information indicating a use stop lane among the plurality of second lanes, based on second error information that is output from the interface unit, and cause the transmission processing unit to generate transmission information including the second degeneration information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a trigger for lane degeneration and a trigger for releasing the lane degeneration.

FIG. 9 is a diagram illustrating an example of a specification method of degeneration of a physical lane, in the operation before link-up illustrated in FIG. 8.

FIG. 10 is a diagram illustrating an example of an operation after link-up of the information processing device illustrated in FIG. 2.

FIG. 11 is a diagram illustrating another example of the operation after link-up of the information processing device illustrated in FIG. 2.

FIG. 12 is a diagram illustrating another example of the operation after link-up of the information processing device illustrated in FIG. 2.

FIG. 13 is a diagram illustrating another example of the operation after link-up of the information processing device illustrated in FIG. 2.

FIG. 14 is a diagram illustrating an example of a specification method of degeneration of a physical lane, in the operation after link-up illustrated in FIGS. 10 to 13.

DESCRIPTION OF EMBODIMENTS

Below, embodiments will be described with reference to the drawings.

Figure 1:
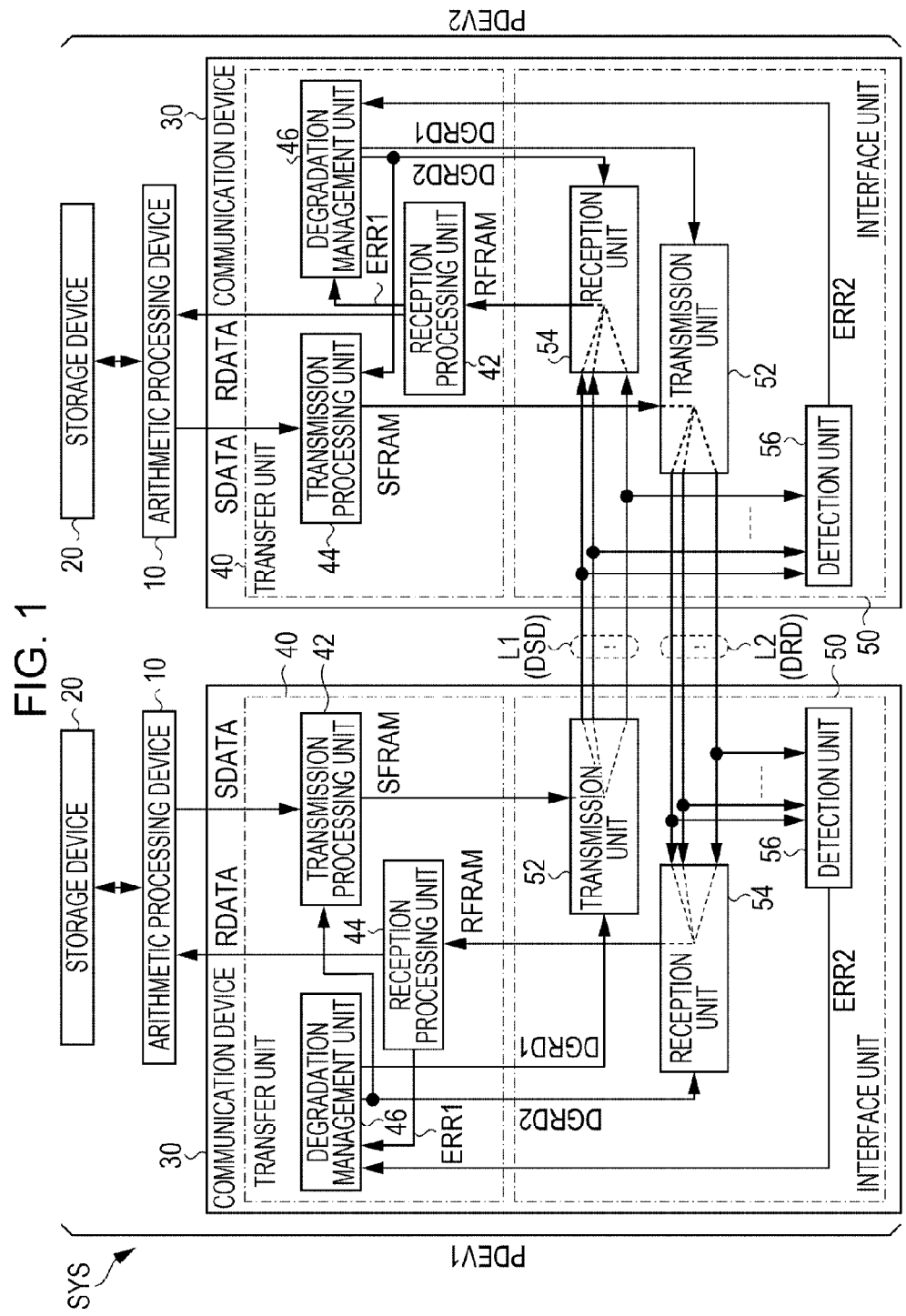
FIG. 1 is a diagram illustrating an embodiment of an information processing device, an information processing system, and a communication device.

FIG. 1 illustrates an embodiment of an information processing device, an information processing system, and a communication device. An information processing system SYS illustrated in FIG. 1 includes a plurality of information processing devices PDEV1 and PDEV2 which are connected with each other through a plurality of lanes L1 and a plurality of lanes L2. The respective information processing devices PDEV1 and PDEV2 include an arithmetic processing device 10, a storage device 20, and a communication device 30. The storage device 20 stores data that is processed by the arithmetic processing device 10. The communication device 30 includes a frame transfer unit 40 and an interface unit 50. The frame transfer unit 40 includes a transmission processing unit 42, a reception processing unit 44, and a degeneration management unit 46. The frame transfer unit 40 is an example of a transfer unit that outputs transmission frame data SFRAM including transmission data SDATA that is output from the arithmetic processing device 10 and reception data included in a reception frame data RFRAM to the arithmetic processing device 10. The transmission frame data SFRAM is an example of transmission information, and the reception frame data RFRAM is an example of reception information.

The interface unit 50 includes a transmission unit 52, a reception unit 54, and a detection unit 56. Since the information processing devices PDEV1 and PDEV2 have configurations which are the same as or similar to each other, the information processing device PDEV1 will be mainly described below. The operation of the information processing device PDEV1 described below may be performed by the information processing device PDEV2.

In the frame transfer unit 40 of the information processing device PDEV1, the transmission processing unit 42 receives the data SDATA that is output from the arithmetic processing device 10, and generates the frame data SFRAM including the data SDATA. Further, the transmission processing unit 42 generates the frame data SFRAM including the degeneration information DGRD2 which is received from the degeneration management unit 46.

The reception processing unit 44 extracts the data RDATA included in the frame data RFRAM that is received from the plurality of lanes L2, and outputs the extracted data RDATA to the arithmetic processing device 10. Further, the reception processing unit 44 extracts error information ERR1 indicating an error in any of the first lanes L1 included in the frame data RFRAM, and outputs the extracted error information ERR1 to the degeneration management unit 46.

The degeneration management unit 46 generates degeneration information DGRD1 indicating a use stop lane for which use is stopped, among the plurality of lanes L1, based on error information ERR1, and outputs the generated degeneration information DGRD1 to the transmission unit 52. The degeneration management unit 46 generates degeneration information DGRD2 indicating a use stop lane for which use is stopped, among the plurality of lanes L2, based on error information ERR2 which is output from the detection unit 56, and outputs the generated degeneration information DGRD2 to the reception unit 54. Further, the degeneration management unit 46 outputs the degeneration information DGRD2 to the transmission processing unit 42, and causes the transmission processing unit 42 to generate frame data SFRAM including the degeneration information DGRD2. In the following description, reducing the number of lanes L1 or lanes L2 to be used by stopping the use of any of the lanes L1 or lanes L2 is also referred to as degeneration.

In the interface unit 50 of the information processing device PDEV1, the transmission unit 52 distributes the frame data SFRAM that is output from the transmission processing unit 42, to a plurality of pieces of distribution transmission data DSD, and transmits the distributed distribution transmission data DSD to the plurality of lanes L1, respectively. At this time, the transmission unit 52 transmits the distribution transmission data DSD corresponding to the frame data SFRAM, to the lanes other than the use stop lane indicated by the degeneration information DGRD1, among the plurality of lanes L1.

The reception unit 54 collects a plurality of pieces of distribution reception data DRD which are respectively received through the plurality of lanes L2, and outputs the collected frame data RFRAM to the reception processing unit 44. At this time, the reception unit 54 generates the frame data RFRAM from the distribution reception data DRD which is received through the lanes other than the use stop lane indicated by the degeneration information DGRD2, among the plurality of lanes L2.

The detection unit 56 detects an error in a plurality of pieces of distribution reception data DRD, generates the error information ERR2 indicating the lane L2 through which the error-detected distribution reception data DRD is received, and outputs the generated error information ERR2 to the degeneration management unit 46.

For example, when the detection unit 56 detects an error of any distribution reception data DRD, the reception unit 54 stops the use of the lane L2 through which the error-detected distribution reception data DRD is received, based on the degeneration information DGRD2 generated by the degeneration management unit 46. Further, the transmission processing unit 42 generates frame data SFRAM including information indicating the lane L2 for which use is stopped, based on the degeneration information DGRD2, and transmits the frame data SFRAM to the information processing device PDEV2 of a communication destination through the transmission unit 52. The reception processing unit 42 of the information processing device PDEV2 of a communication destination extracts the error information ERR1 included in the frame data RFRAM, and outputs the error information ERR1 to the degeneration management unit 46. The degeneration management unit 46 of the information processing device PDEV2 of a communication destination outputs the degeneration information DGRD1 to the transmission unit 52, based on the error information ERR1, and causes the transmission unit 52 to stop using the lane L2 indicated by the use stop lane included in the degeneration information DGRD1. In other words, the information processing devices PDEV1 and PDEV2 can cause the error-detected lane to be degenerated, based on the detection of an error in the distribution reception data DRD which is detected by one of the information processing devices PDEV1 and PDEV2.

A process of specifying a failed lane L2 based on the detection of an error, and stopping the use of the specified lane L2 is performed by the frame transfer unit 40. In other words, in the embodiment illustrated in FIG. 1, if the interface unit 50 that inputs and outputs data to and from the lanes L1 and L2 does not have a function of specifying the failed lane L2, it is possible to cause the lane L2 to be degenerated without changing the protocol of the interface unit 50.

Therefore, without adding a new function to the interface unit 50, it is possible to specify the lane L2 for which use has been stopped, and to stop the use of the specified lane L2, based on the detection of an error in the distribution reception data DRD. At this time, the information processing device PDEV of a communication destination can stop the use of the error-detected lane L2, by transmitting the frame data SFRAM including the degeneration information DGRD2 indicating the lane L2 for which use has been stopped, to the information processing device PDEV of a communication destination.

Furthermore, even when the interface unit 50 does not have a function of specifying the failed lanes L1 and L2, it is possible to detect a failure in the lanes L1 and L2, and to cause the failed lanes L1 and L2 to be degenerated, such that it is possible to improve the reliability of the information processing system SYS.

In addition, when degeneration information DGRD2 indicating the lane L2 for which use is stopped is generated based on the error information ERR2, the degeneration management unit 46 of the information processing device PDEV1 may generate degeneration information DGRD1 to stop the use of the lanes L1 of a predetermined number (for example, exponent of 2). In this case, the degeneration information DGRD1 is also transmitted to the information processing device PDEV2 through the transmission processing unit 42, and the information processing device PDEV2 stops the use of a predetermined number of lanes L1. Similarly, when degeneration information DGRD2 indicating the lane L1 for which use is stopped is generated based on the error information ERR2, the degeneration management unit 46 of the information processing device PDEV2 may generate degeneration information DGRD1 to stop the use of a predetermined number of lanes L2. In this case, the degeneration information DGRD1 is also transmitted to the information processing device PDEV1 through the transmission processing unit 42, and the information processing device PDEV2 stops the use of a predetermined number of lanes L2. As a result, the use of a predetermined number of lanes L1 and L2 is stopped in both the information processing devices PDEV1 and PDEV2, based on the detection of the error of the data which is received through the lane L2 (or lane L1). In addition, in order to align the transmission rate of data in the lanes L1 and L2, it is preferable that the number of lanes L2 for which use is stopped and the number of lanes L1 for which use is stopped are the same.

Figure 2:
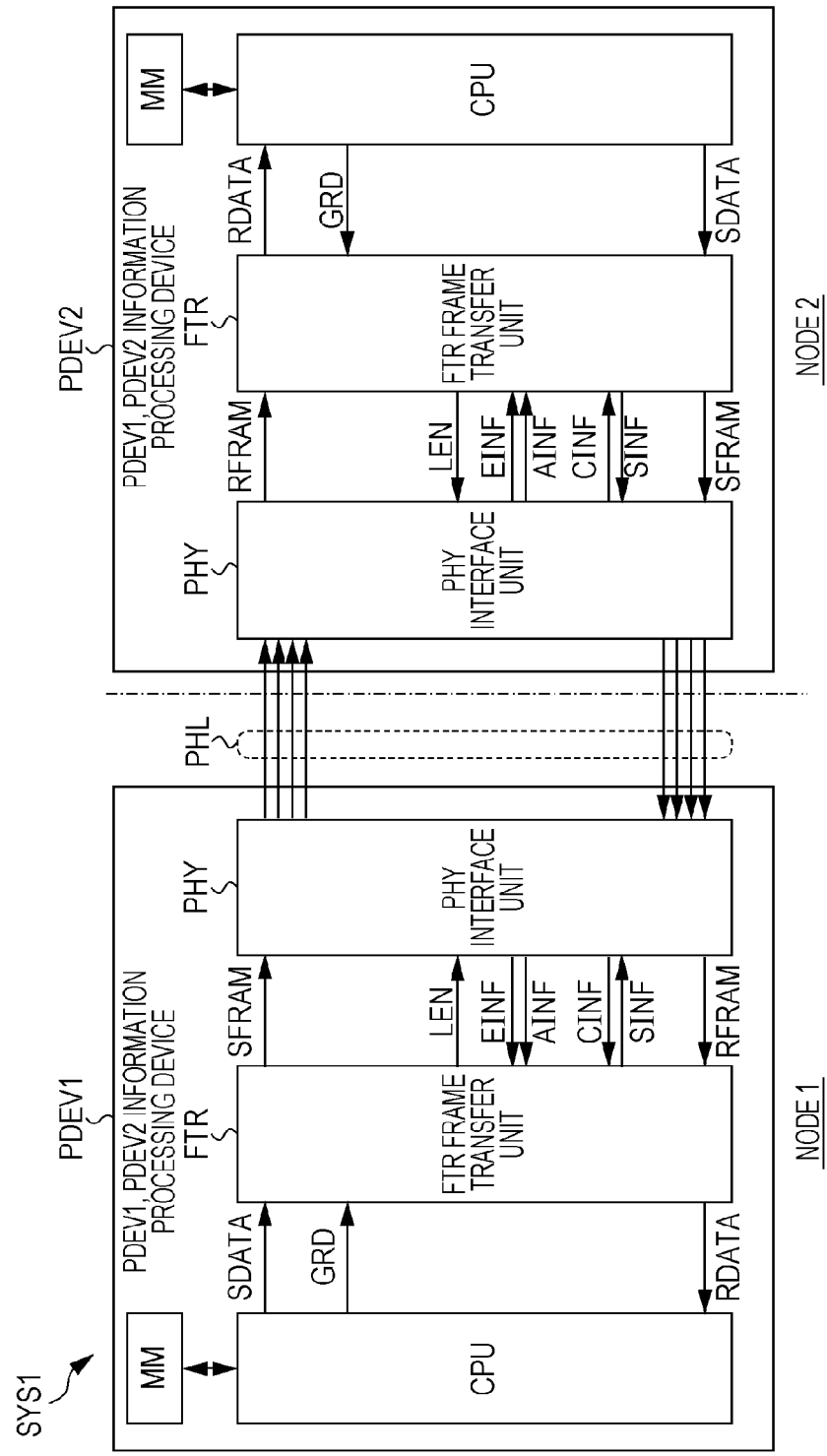
FIG. 2 is a diagram illustrating another embodiment of the information processing device, the information processing system, and the communication device.

FIG. 2 is a diagram illustrating another embodiment of the information processing device, the information processing system, and the communication device. An information processing system SYS1 illustrated in FIG. 2 includes a plurality of information processing devices PDEV (PDEV1 and PDEV2) which are connected with each other through a link including a plurality of channels PHL (hereinafter, also referred to as physical lanes PHL). The information processing devices PDEV1 and PDEV2 have a function of transferring data to each other using the plurality of physical lanes PHL. An optical transmission scheme or an electrical transmission scheme is applied to the link that connects the information processing devices PDEV1 and PDEV2 with each other.

Since the information processing devices PDEV1 and PDEV2 respectively correspond to nodes in the information processing system SYS1, hereinafter, the information processing devices PDEV1 and PDEV2 are also referred to as nodes. The respective information processing devices PDEV1 and PDEV2 includes an interface unit PHY, a frame transfer unit FTR, a central processing unit (CPU), and a main memory MM, of which each realizes the function of a physical layer.

In addition, the information processing system SYS1 may include three or more information processing devices PDEV, and in this case, each information processing device PDEV is connected to predetermined number of other information processing devices PDEV, through the physical lane PHL. Further, the information processing device PDEV may include a plurality of sets of which each includes the interface unit PHY and frame transfer unit FTR, for one CPU.

The CPU operates based on the program stored in the main memory MM, and performs arithmetic processes. The CPU is an example of an arithmetic processing device that performs arithmetic processes. The CPU transmits the data SDATA to the frame transfer unit FTR, and receives the data RDATA from the frame transfer unit FTR. The data RDATA may include data to be used in the calculation performed by the CPU, and the data SDATA may include the results of operations performed by the CPU.

In addition, the information processing system SYS1 has a low power mode for reducing power consumption by stopping the use of a predetermined number of physical lanes PHL among a plurality of ones. When the operation mode of the information processing system SYS1 transitions from a normal operation mode to a low power mode, and the operation mode of the information processing system SYS1 transitions from the low power mode to the normal operation mode, the CPU outputs a switching notification GRD to the frame transfer unit FTR.

The main memory MM is a storage device such as a memory module, and stores programs performed by the CPU, data processed by the CPU, and the like. The main memory MM an example of a storage device that stores data and programs handled by the CPU, and is accessed by the CPU.

The frame transfer unit FTR is a circuit block corresponding to a higher layer (for example, a data link layer) than the physical layer corresponding to the interface unit PHY. The frame transfer unit FTR receives the data SDATA from the CPU, generates a frame data SFRAM containing the received data SDATA, and transfers the generated frame data SFRAM to the interface unit PHY. In addition, the frame transfer unit FTR receives the frame data RFRAM from the interface unit PHY, and transfers data RDATA that is included in the received frame data RFRAM to the CPU. Each of the frame data SFRAM and RFRAM includes a predetermined number of packets which is a transmission unit of data. The number of the transmitted and received frame data SFRAM and RFRAM varies depending on the size of the transmitted and received data SDATA and RDATA.

Further, the frame transfer unit FTR performs control to stop the use of a predetermined number of physical lanes PHL among a plurality of ones, or control to restart the use of the stopped physical lanes PHL, based on the switching notification GRD from the CPU. In the following description, stopping the use of the physical lane PHL is also referred to as degeneration or lane degeneration, and restarting the use of the stopped physical lane PHL is referred to as restoration of a lane or release of lane degeneration.

Figure 3:
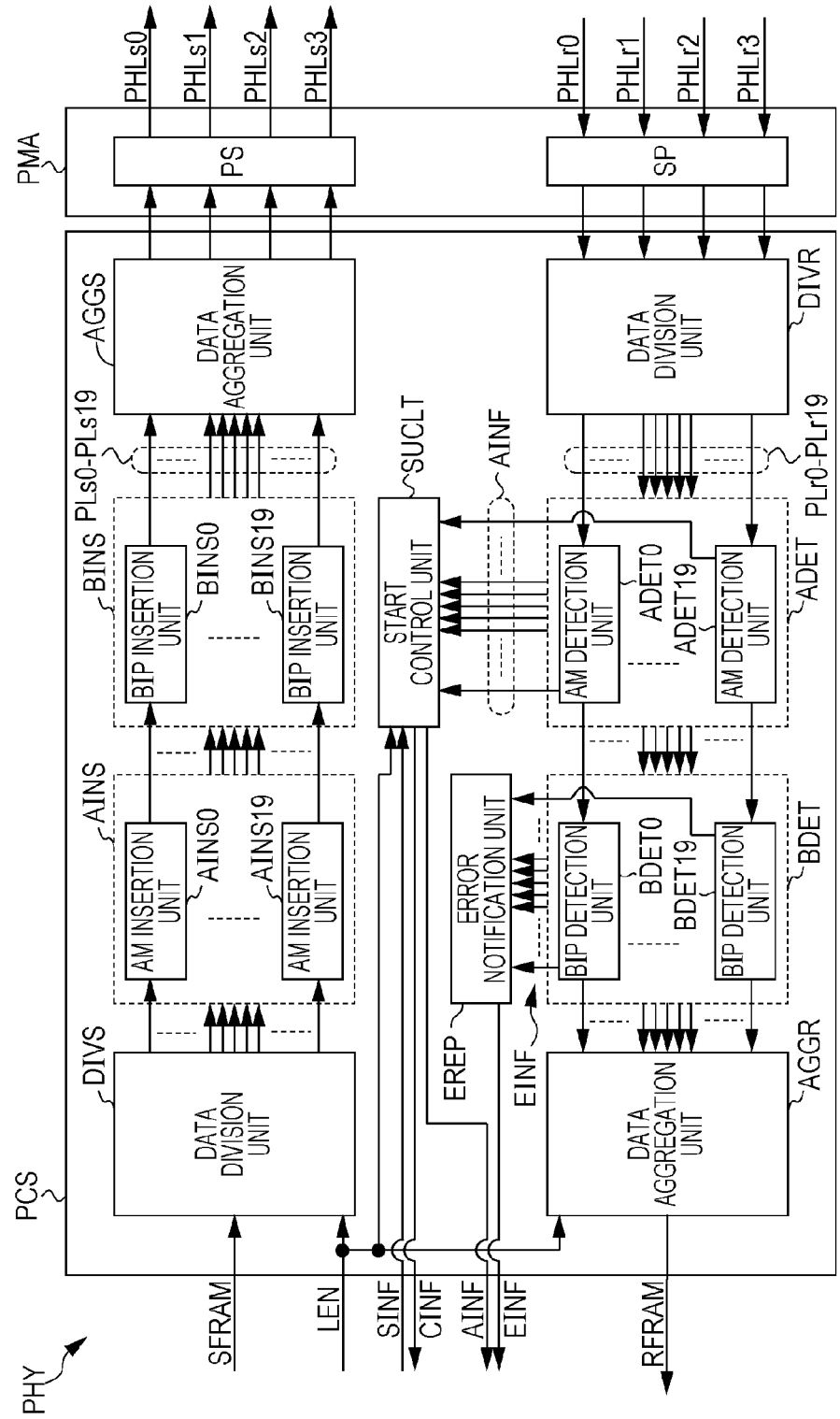
FIG. 3 is a diagram illustrating an example of an interface unit illustrated in FIG. 2.
Figure 4:
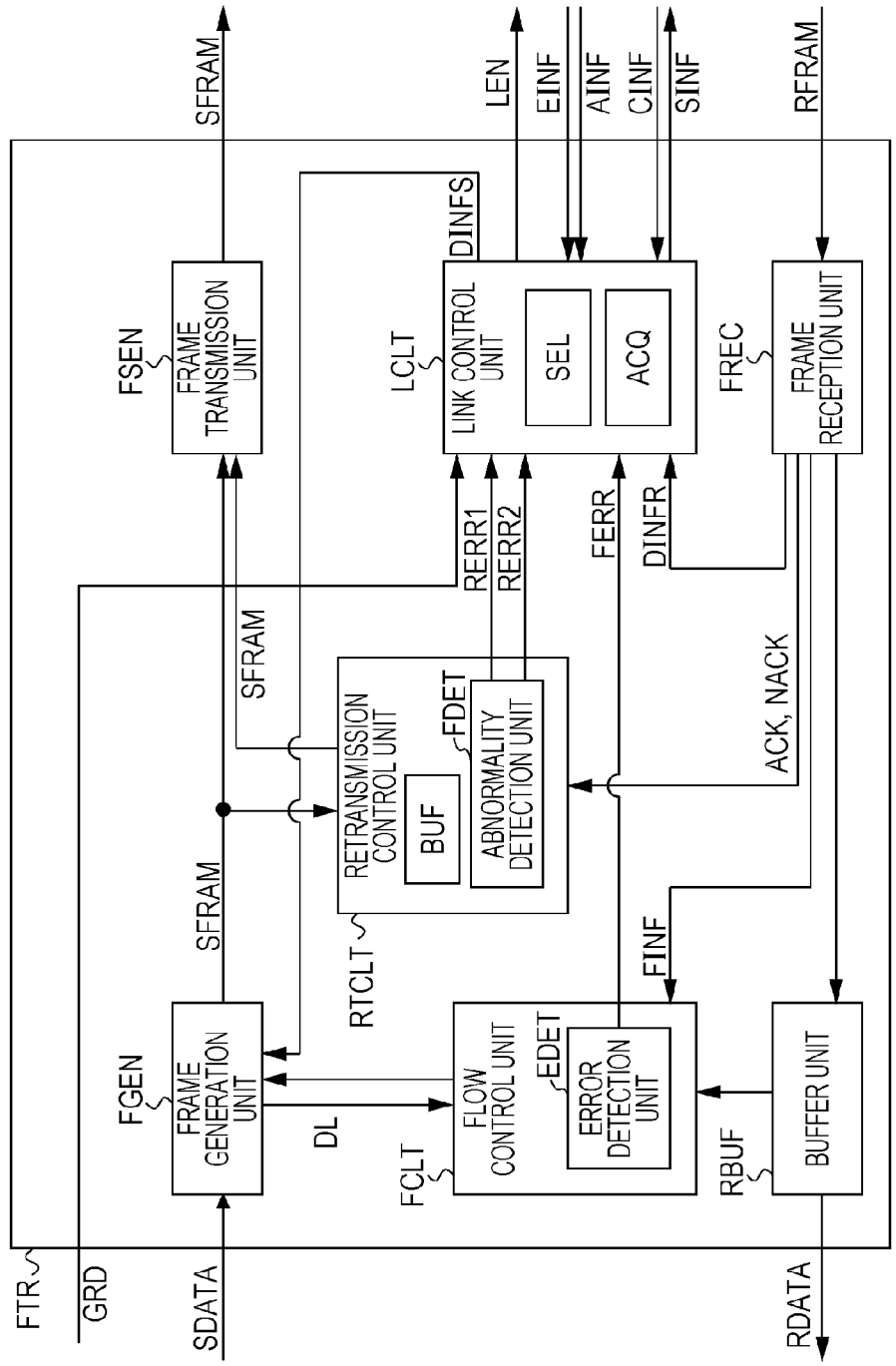
FIG. 4 is a diagram illustrating an example of a frame transfer unit illustrated in FIG. 2.

The frame transfer unit FTR outputs an instruction notification SINF instructing the interface unit PHY to start or stop a transmission and reception function of data and an enable signal LEN indicating a valid physical lane PHL, to the interface unit PHY. The frame transfer unit FTR receives a start completion notification CINF indicating that the start of the interface unit PHY has been completed and error information EINF indicating that the interface unit PHY has detected an error in the received data, from the interface unit PHY. In addition, the frame transfer unit FTR receives alignment marker detection information AINF indicating that the interface unit PHY has detected an alignment marker, from the interface unit PHY. The alignment marker is inserted at an interval of a predetermined number of data blocks in order to absorb skew in data transferred over the physical lane PHL and detect the bit error in data. The specifications of the start completion notification CINF, the error information EINF, and the alignment marker detection information AINF will be described with reference to FIG. 3. An example of the frame transfer unit FTR is illustrated in FIG. 4.

The interface unit PHY is an example of a physical layer device corresponding to the physical layer of an open systems interconnection (OSI) reference model, and has a function conforming to Layer 1 (physical layer) of IEEE802.3ba standard. The interface unit PHY distributes the frame data SFRAM that has been received from the frame transfer unit FTR to a plurality of pieces of data, and respectively transmits them to a plurality of physical lanes PHL. In addition, the interface unit PHY collects a plurality of pieces of data received through a plurality of physical lanes PHL to the frame data RFRAM, and outputs the frame data RFRAM which are collected to the frame transfer unit FTR. The plurality of pieces of data that are generated by distributing the frame data SFRAM is an example of the divided transmission data, and a plurality of pieces of data which are collected to the frame data RFRAM is an example of distribution reception data.

The interface unit PHY starts or stops the transmission and reception function of data, based on the instruction notification SINF from the frame transfer unit FTR. If the instruction notification SINF indicates a start instruction, the interface unit PHY performs a start process such as link-up which makes a state allowing communication with the interface unit PHY of the information processing device PDEV of the other party. If the start has been completed, the interface unit PHY outputs a start completion notice CINF to the frame transfer unit FTR. If the instruction notification SINF indicates a stop instruction, the interface unit PHY performs a stop process for stopping the transmission and reception function such as disconnecting of the link.

The interface unit PHY enables or disables a predetermined number of physical lanes PHL among a plurality of ones, based on the enable signal LEN from the frame transfer unit FTR. The enabled physical lane PHL is used for transfer of information, and the disabled physical lane PHL is not used for transfer of information. When detecting an error in the data received through the physical lane PHL, the interface unit PHY outputs error information EINF to the frame transfer unit FTR. Further, when detecting an alignment marker in the data that has been received through the physical lane PHL, the interface unit PHY outputs the alignment marker detection information AINF to the frame transfer unit FTR. Hereinafter, the alignment marker detection information is also referred to as AM detection information. An example of the interface unit PHY is illustrated in FIG. 3. In addition, in the following, for ease of description, it is assumed that the error in the data received through the physical lane PHL does not occur simultaneously in both the information processing devices PDEV1 and PDEV2.

For example, if the CPU of the node 1 outputs a switching notification GRD indicating transition from the normal operation mode to the low power mode, the frame transfer unit FTR of the node 1 outputs the enable signal LEN to the interface unit PHY. The interface unit PHY causes a predetermined number of physical lanes PHL to be degenerated on the transmission side and a predetermined number of physical lanes PHL to be degenerated on the reception side, based on the enable signal LEN. In addition, the frame transfer unit FTR transmits a control packet indicating the degeneration of the physical lane PHL of the node 2, to the node 2 through the interface unit PHY. The frame transfer unit FTR of the node 2 outputs the enable signal LEN to the interface unit PHY, based on the control packet received from the node 1. Then, the interface unit PHY of the node 2 causes a predetermined number of physical lanes PHL to be degenerated on the transmission side and a predetermined number of physical lanes PHL to be degenerated on the reception side, based on the enable signal LEN.

Meanwhile, if the CPU of the node 1 outputs a switching notification GRD indicating the transition from the low power mode to the normal operation mode, the frame transfer unit FTR of the node 1 outputs the enable signal LEN to the interface unit PHY. The interface unit PHY restores the predetermined number of physical lanes PHL that have been degenerated on the transmission side and the predetermined number of physical lanes PHL that have been degenerated on the reception side, based on the enable signal LEN. In addition, the frame transfer unit FTR transmits the control packet instructing the release of the degeneration of the physical lane PHL of the node 2, to the node 2 through the interface unit PHY. The frame transfer unit FTR of the node 2 outputs the enable signal LEN to the interface unit PHY, based on the control packet received from the node 1. Then, the interface unit PHY of the node 2 restores the predetermined number of physical lanes PHL that have been degenerated on the transmission side and the predetermined number of physical lanes PHL that have been degenerated on the reception side, based on the enable signal LEN.

Further, even when the CPU of the node 2 outputs the switching notification GRD, the same operation as above is performed. Further, only the CPU of either the node 1 or the node 2 may also have a function of outputting the switching notification GRD. Furthermore, the degeneration and the restoration of the physical lane PHL may be performed only in the physical lane PHL of one direction (a transmission path for transmitting data from the node 1 to the node 2, or a transmission path for transmitting data from the node 2 to the node 1). In this case, the switching notification GRD includes information indicating whether to cause the physical lane PHL to be degenerated or be restored in either the transmission direction or the reception direction.

FIG. 3 illustrates an example of the interface unit PHY illustrated in FIG. 2. The interface unit PHY includes a physical coding sublayer (PCS) and a physical medium attachment (PMA). The PCS distributes the data received from the frame transfer unit FTR to a plurality of PCS lanes PLs (PLs0 to PLs19), aggregates the data that has been distributed to the PCS lanes PLs corresponding to each physical lane PHL, and outputs the aggregated data. In addition, the PCS distributes the data received through the physical lane PHL to the plurality of PCS lanes PLr (PLr0 to PLr19), aggregates the data that has been distributed to the PCS lanes PLr, and outputs the aggregated data to the frame transfer unit FTR.

In FIG. 3, in order to facilitate understanding of the description, PCS lanes PLs0 to PLs4 are aggregated into a physical lane PHLs0, and PCS lanes PLr0 to PLr4 are aggregated into a physical lane PHLr0. PCS lanes PLs5 to PLs9 are aggregated into a physical lane PHLs1, and PCS lanes PLr5 to PLr9 are aggregated into a physical lane PHLr1. PCS lanes PLs10 to PLs14 are aggregated into a physical lane PHLs2, and PCS lanes PLr10 to PLr14 are aggregated into a physical lane PHLr2. PCS lanes PLs15 to PLs19 are aggregated into a physical lane PHLs3, and PCS lanes PLr15 to PLr19 are aggregated into a physical lane PHLr3. In addition, the correspondence between the PCS lane PLs and the physical lane PHLs and the correspondence between the PCS lane PLr and the physical lane PHLr may be added to information to be transmitted such as an alignment marker.

The PCS includes data division units DIVS and DIVR, AM insertion units AINS, a bit interleaved parity (BIP) insertion unit BINS, data aggregation units AGGS and AGGR, an AM detection unit ADET, a BIP detection unit BDET, an error notification unit EREP, and a start control unit SUCLT. The data division unit DIVS, the AM insertion unit AINS, the BIP insertion unit BINS, and the data aggregation unit AGGS are examples of a transmission unit that transmits data corresponding to the frame data SFRAM to the physical lane PHLs other than the use stop lane indicated by the enable signal LEN. The data division unit DIVR, the AM detection unit ADET, the BIP detection unit BDET, and the data aggregation unit AGGR are examples of a reception unit that generates the frame data RFRAM from data received through the physical lane PHLr other than the use stop lane indicated by the enable signal LEN. The BIP detection unit BDET and the error notification unit EREP are examples of a detection unit that detects errors in the data received through the physical lane PHLr and generates error information EINF.

The PMA includes a parallel-to-serial converter PS and a serial-to-parallel converter SP. AM insertion units AINS (AINS0 to AINS19) and BIP insertion units BINS (BINS0 to BINS19) are respectively provided for PCS lanes PLs0 to PLs19. AM detection units ADET (ADET0 to ADET19) and BIP detection units BDET (BDET0 to BDET19) are respectively provided for PCS lanes PLr0 to PLr19.

The data division unit DIVS selects a PCS lane PLs corresponding to a valid physical lane PHLs indicated by the enable signal LEN that is received from the frame transfer unit FTR. The PCS lane PLs selected by the enable signal LEN is a valid lane through which data is transferred, and the PCS lane PLs that is not selected by the enable signal LEN is an invalid lane through which data is not transferred.

For example, the data division unit DIVS codes the frame data SFRAM that has been received from the frame transfer unit FTR, in groups of 64 bits, to data of 66 bits (64 B/66 B coding). Then, the data division unit DIVS outputs the coded 66-bit blocks to the AM insertion unit AINS corresponding to the PCS lane PLs, by allocating the coded 66-bit blocks to a valid PCS lane PLs in units of blocks.

Each AM insertion unit AINS inserts the alignment marker at an interval of a predetermined number of blocks that have been received from the data division unit DIVS, and outputs the block and the alignment marker to the corresponding BIP insertion units BINS (BINS0 to BINS19). For example, each AM insertion unit AINS inserts the alignment marker at an interval of 16383 blocks. In addition, the operation of the AM insertion unit AINS corresponding to the PCS lane PLs that is not selected by the enable signal LEN which is received by the data division unit DIVS may be stopped.

Each BIP insertion unit BINS calculates the parity bit interleaved parity (BIP) of data included in the alignment marker and 16383 blocks, and stores the calculated parity BIP in a predetermined area in the alignment marker. Each BIP insertion unit BINS outputs the alignment marker storing the parity BIP and the block, to a data aggregation unit AGGS. In addition, the alignment marker has an area for storing an identifier of the PCS lane, and the information processing device PDEV of a transmission destination of the data is able to recognize correspondence with the PCS lane of the information processing device PDEV of a transmission source of data, by decrypting the alignment marker. In addition, the operation of the BIP insertion unit BINS corresponding to the PCS lane PLs that is not selected by the enable signal LEN which is received by the data division unit DIVS may be stopped.

The data aggregation unit AGGS aggregates the data that has been received from the BIP insertion unit BINS to a data group, for each unit of five PCS lanes PLs (for example, PLs0 to PLs4), and outputs each of the aggregated data groups to the parallel-to-serial converter PS of the PMA. In addition, in the data aggregation unit AGGS, with respect to the circuit corresponding to the PCS lane PLs that is not selected by the enable signal LEN which is received by the data division unit DIVS, the operation may be stopped.

The parallel-to-serial converter PS of the PMA converts each of the four data groups that have been received from the data aggregation unit AGGS into serial data. For example, when a bit width of each data group is 32 bits, the parallel-to-serial converter PS converts 32-bit parallel data into one bit serial data. The parallel-to-serial converter PS transmits each of the converted serial data to the information processing device PDEV which is the transmission destination of data, through physical lanes PHLs0 to PHLs3.

The physical lanes PHLs0 to PHLs3 are referred to as physical lanes PHLr0 to PHLr3 in the information processing device PDEV which is the transmission destination of data. In addition, in the parallel-to-serial converter PS, with respect to the circuit corresponding to the PCS lane PLs that is not selected by the enable signal LEN which is received by the data division unit DIVS, the operation may be stopped. Further, when the optical signal is transmitted through the physical lanes PHLs0 to PHLs3, the photoelectric converter that converts an electrical signal into an optical signal is disposed between the parallel-to-serial converter PS and the physical lane PHLs0 to PHLs3.

The serial-to-parallel converter SP of the PMA receives serial data from the information processing device PDEV which is the transmission source of data, through the respective physical lanes PHLr0 to PHLr3. The physical lanes PHLr0 to PHLr3 are referred to as physical lanes PHLs0 to PHLs3 in the information processing device PDEV which is the transmission source of data. The serial-to-parallel converter SP generates four data groups by converting each piece of serial data into parallel data, and outputs each of the generated data groups to the data division unit DIVR.

For example, when a bit width of each data group is 32 bits, the serial-to-parallel converter SP converts one bit serial data into 32-bit parallel data. In addition, in the serial-to-parallel converter SP, with respect to the circuit corresponding to the PCS lane PLr that is not selected by the enable signal LEN which is received by the data aggregation unit AGGR, the operation may be stopped. Further, when the optical signal is transmitted through the physical lanes PHLs0 to PHLs3, a photoelectric converter that converts an optical signal into an electrical signal is disposed between the respective physical lanes PHLr0 to PHLr3 and the serial-to-parallel converter SP.

The data division unit DIVR distributes each data group that has been received from the serial-to-parallel converter SP into five PCS lanes PLr (for example, PLr0 to PLr4). The data division unit DIVR outputs the data which has been distributed to each of the PCS lanes PLr0 to PLr19, to the corresponding AM detection units ADET (ADET0 to ADET19). In addition, in the data division unit DIVR, with respect to the circuit corresponding to the PCS lane PLr that is not selected by the enable signal LEN which is received by the data aggregation unit AGGR, the operation may be stopped.

Each AM detection unit ADET outputs the data and the alignment marker that have been received from the data division unit DIVR, to respective BIP detection units BDET (BDET0 to BDET19). When detecting the alignment marker from the data received from the data division unit DIVR, each AM detection unit ADET outputs the AM detection information AINF indicating that the alignment marker has been detected, to the start control unit SUCLT. In addition, with respect to the AM detection unit ADET corresponding to the PCS lane PLr that is not selected by the enable signal LEN which is received by the data aggregation unit AGGR, the operation may be stopped.

Each BIP detection unit BDET outputs the data that has been received from the AM detection unit ADET, to the data aggregation unit AGGR. Further, each BIP detection unit BDET detects the code error in the data that has been received from each AM detection unit ADET, using a parity BIP included in the alignment marker. Each BIP detection unit BDET outputs the detection result of a code error as the error information EINF, to the error notification unit EREP.

In addition, with respect to the BIP detection unit BDET corresponding to the PCS lane PLr that is not selected by the enable signal LEN which is received by the data aggregation unit AGGR, the operation may be stopped.

The data aggregation unit AGGR selects a PCS lane PLr corresponding to a valid physical lane PHL from a plurality of PCS lanes PLr (PLr0 to PLr19), based on the enable signal LEN that is received from the frame transfer unit FTR. Here, a decrease in the number of valid physical lanes PHL and the number of PCS lanes PLr based on the enable signal LEN is referred to as lane degeneration. An increase in the number of valid physical lanes PHL and the number of PCS lanes PLr based on the enable signal LEN is referred to as restoration of the degenerated physical lane PHL or restarting of the physical lane PHL for which use has been stopped.

In addition, the data aggregation unit AGGR decodes data obtained by the information processing device PDEV of a transmission source performing 64 B/66 B coding, for each valid PCS lane PLr. Then, the data aggregation unit AGGR generates the frame data RFRAM by aggregating the data obtained by being decoded for each PCS lane PLr, and outputs the generated frame data RFRAM to the frame transfer unit FTR illustrated in FIG. 2.

If the start control unit SUCLT receives an instruction notification SINF indicating a start instruction of the transmission and reception function of data, it performs a start process of starting the interface unit PHY. After the execution of the start process, if the alignment marker is detected from all valid PCS lanes PLr which are selected in response to the enable signal LEN, the start control unit SUCLT outputs a start completion notification CINF indicating the start completion to the frame transfer unit FTR.

In addition, the start control unit SUCLT outputs the AM detection information AINF on the PCS lane PLr which is received from each AM detection unit ADET to the frame transfer unit FTR. The start control unit SUCLT includes a register that holds the AM detection information AINF that is received from each AM detection unit ADET.

The error notification unit EREP outputs the error information EINF on the PCS lane PLr that is received from each BIP detection unit BDET, to the frame transfer unit FTR. The error notification unit EREP includes a register that holds the error information EINF that is received from each BIP detection unit BDET.

The configuration of the interface unit PHY is not limited to the example illustrated in FIG. 3. For example, the start control unit SUCLT may not output the AM detection information AINF to the frame transfer unit FTR, and each AM detection unit ADET may output AM detection information AINF to the frame transfer unit FTR. Further, for example, the error information EINF may be output directly from each BIP detection unit BDET to the frame transfer unit FTR. Furthermore, the number of PCS lanes PL (PLs and PLr) is not limited to 20, and the number of physical lanes PHL (PHLs and PHLr) is not limited to four.

As described in FIG. 2, the interface unit PHY causes the lane PHL to be degenerated or restores the degenerated physical lane PHL, based on the enable signal LEN that has been generated by the frame transfer unit FTR. Thus, even in the case of using the interface unit PHY without a function of specifying a failed physical lane (hereinafter, also referred to as a failure lane specifying function), it is possible to control the degeneration of the physical lane PHL.

Therefore, for example, even when one to three physical lanes PHL out of a plurality of ones fail, the information processing system SYS1 can maintain the link by causing the failed physical lane PHL to be degenerated. As a result, the information processing system SYS1 can perform a process such as a parallel computation using a node (information processing device PDEV) including the failed physical lane PHL. In other words, as compared to the information processing system in which a link between nodes is disconnected when only one of the plurality of physical lanes PHL fails, the reliability of the information processing system SYS1 is improved.

In addition, the information processing system SYS1 causes a predetermined number of physical lanes PHL to be degenerated based on an instruction of switching from the normal mode to the low power mode, and restores the degenerated physical lane PHL based on an instruction of switching from the low power mode to the normal mode. If there is a plurality of types of low power modes, the number of physical lanes PHL to be degenerated may be set according to the type of the low power mode.

FIG. 4 illustrates an example of the frame transfer unit FTR illustrated in FIG. 2. The frame transfer unit FTR includes a frame generation unit FGEN, a frame transmission unit FSEN, a retransmission control unit RTCLT, a frame reception unit FREC, a buffer unit RBUF, a flow control unit FCLT, and a link control unit LCLT.

The frame generation unit FGEN and the frame transmission unit FSEN are an example of a transmission processing unit that generates the frame data SFRAM. The frame reception unit FREC is an example of a reception processing unit that extracts the data RDATA that is included in the frame data RFRAM and the degeneration information DINFR that is included in the frame data RFRAM. The link control unit LCLT is an example of a degeneration management unit that generates degeneration information DINFS and the enable signal LEN based on the error information EINF, and generates an enable signal LEN based on the degeneration information DINFR. The degeneration information DINFR is an example of error information indicating an error in any of a plurality of physical lanes PHLr, which is included in the frame data RFRAM, and is an example of failure information indicating failure of any of the physical lanes PHLr. The enable signal LEN is an example of degeneration information indicating the physical lane PHLr for which use is stopped and the physical lane PHLs for which use is stopped.

The frame generation unit FGEN generates the frame data SFRAM by converting information such as data SDATA that has been received from the CPU or degeneration information DINFS that has been received from the link control unit LCLT into a frame format. The frame generation unit FGEN outputs the generated frame data SFRAM to the frame transmission unit FSEN and the retransmission control unit RTCLT. In addition, the frame generation unit FGEN outputs information DL indicating the data length of the frame data SFRAM to the flow control unit FCLT.

The frame transmission unit FSEN includes a buffer that holds the frame data SFRAM that has been received from the frame generation unit FGEN or the frame data SFRAM that has been received from the retransmission control unit RTCLT. The frame transmission unit FSEN transmits the frame data SFRAM that has been held in the buffer to the interface unit PHY.

In addition, there is a case where the clock used in the frame transfer unit FTR and the clock used in the interface unit PHY are different from each other. In this case, the buffer of the frame transmission unit FSEN synchronizes the frame data SFRAM that has been received in synchronization with the clock used in the frame transfer unit FTR to the clock used in the interface unit PHY, and outputs the synchronized frame data to the interface unit PHY. In other words, the frame transmission unit FSEN performs switching of clocks which are asynchronous with each other in the frame transfer unit FTR and the interface unit PHY.

The frame reception unit FREC includes a buffer that holds the frame data RFRAM that is received from the interface unit PHY. The frame reception unit FREC outputs the received frame data RFRAM to the buffer unit RBUF. The frame data RFRAM that is received by the frame reception unit FREC corresponds to the frame data SFRAM that is transmitted from the frame transfer unit FTR of the information processing device PDEV which is the transmission source.

The buffer of the frame reception unit FREC, similarly to the buffer of the frame transmission unit FSEN, synchronizes the frame data RFRAM that has been received in synchronization with the clock used in the interface unit PHY, to the clock used in the frame transfer unit FTR, and outputs the synchronized frame data to the buffer unit RBUF. In other words, the frame reception unit FREC performs switching of clocks which are asynchronous with each other in the frame transfer unit FTR and the interface unit PHY.

The frame reception unit FREC has a detection function of a control packet (DLLP: data link layer packet). When it is detected that the flow control information FINF representing the free space of the buffer unit RBUF of the information processing device PDEV which is a transmission destination of the data is contained in the packet DLLP, the frame reception unit FREC outputs the detected flow control information FINF to the flow control unit FCLT. Here, the flow control information FINF is transmitted using a flow control frame. For example, a credit release notification indicating that the buffer unit RBUF of the information processing device PDEV which is a transmission destination of the data is vacant, is included in the flow control information FINF.

The frame reception unit FREC detects whether or not link control information is included in the packet DLLP, and here, the link control information indicates the link-up or link-down of the data link layer, degeneration information DINFR regarding degeneration of physical lane PHL, and the like. If the link control information is included in the packet DLLP, the frame reception unit FREC outputs the detected link control information as degeneration information DINFR to link control unit LCLT. In addition, the link-down indicates that communication is interrupted between the interface units PHY in the information processing devices PDEV that transmit and receive data. The degeneration information DINFR corresponds to the degeneration information DINFS that is transmitted from the link control unit LCLT of the information processing device PDEV which is the transmission source of data.

In addition, the frame reception unit FREC detects whether or not the packet DLLP includes an acknowledgment signal ACK or a negative acknowledgment signal NACK responding to the frame data SFRAM which has been transmitted by the frame transmission unit FSEN. If the packet DLLP includes an acknowledgment signal ACK or a negative acknowledgment signal NACK, the frame reception unit FREC outputs the acknowledgment signal ACK or the negative acknowledgment signal NACK, which are detected, to the retransmission control unit RTCLT.

The buffer unit RBUF sequentially stores the frame data RFRAM that has been received from the frame reception unit FREC, and sequentially outputs the stored frame data RFRAM as data RDATA to the CPU.

The flow control unit FCLT includes an error detection unit EDET. The flow control unit FCLT performs a flow control to adjust the transmission timing of the frame data SFRAM, based on the free space of the buffer unit RBUF of the information processing device PDEV which is the transmission destination of data and the data length DL of the frame data SFRAM. For example, when receiving the flow control information FINF indicating that there is no space in the buffer unit RBUF of the information processing device PDEV which is the transmission destination, the flow control unit FCLT controls the frame generation unit FGEN so as to suppress the transmission of the frame data SFRAM.

In addition, the flow control unit FCLT periodically receives information indicating a free state of the buffer unit RBUF from the buffer unit RBUF. The flow control unit FCLT periodically transmits the received information indicating a free state to the flow control unit FCLT of the information processing device PDEV of the other party, through the frame generation unit FGEN and the frame transmission unit FSEN. The frame reception unit FREC of the information processing device PDEV of the other party detects information indicating a free state of the buffer unit RBUF, as flow control information FINF.

If the period during which the flow control information FINF has not been received exceeds a threshold (for example, 200 microseconds), in other words, the flow control information FINF is not periodically received, the error detection unit EDET of the flow control unit FCLT determines that the fault has occurred in the flow control. In this case, the error detection unit EDET outputs a flow control protocol error notification FERR indicating that the fault has occurred in the channel PHL or the like, to the link control unit LCLT. Hereinafter, the flow control protocol error notification FERR is referred to as the FCPE notification FERR.

The retransmission control unit RTCLT includes a fault detection unit FDET and a buffer BUF. The buffer BUF holds the frame data SFRAM that has been received from the frame generation unit FGEN. The retransmission control unit RTCLT receives an acknowledgment signal ACK and a negative acknowledgment signal NACK from the frame reception unit FREC. When the reception process of the transmitted data has been successfully completed by the information processing device PDEV which is the transmission destination, the acknowledgment signal ACK is output from the frame transfer unit FTR of the information processing device PDEV which is the transmission destination, as a packet DLLP. When the reception process of the transmitted data has not been successfully completed by the information processing device PDEV which is the transmission destination, the negative acknowledgment signal NACK is output from the frame transfer unit FTR of the information processing device PDEV which is the transmission destination, as a packet DLLP.

When receiving the negative acknowledgment signal NACK, the retransmission control unit RTCLT outputs the frame data SFRAM held in the buffer BUF, to the frame transmission unit FSEN, and causes the frame transmission unit FSEN to retransmit the frame data SFRAM.

When deterioration in a bit error rate, a retry-out, or the like is detected based on the acknowledgment signal ACK and the negative acknowledgment signal NACK from the frame reception unit FREC, the fault detection unit FDET determines that fault has occurred in the process related to retransmission. When the number of retransmissions within a predetermined time exceeds a threshold (for example, retransmission requests (in other words, when the negative acknowledgment signal (NACK)) are generated 255 or more times during 24 seconds), the deterioration in the bit error rate is detected. When there is no acknowledgment signal ACK and negative acknowledgment signal NACK for the frame data SFRAM that has been transmitted, and the number of continuous retransmissions exceeds a threshold, the retry-out is detected. For example, when the acknowledgment signal ACK or the negative acknowledgment signal NACK was not received until 12.62 milliseconds has elapsed since the frame data SFRAM was transmitted, retry-out is determined. Further, when the number of continuous retransmissions exceeds 255 times, retry-out is determined.

When detecting the deterioration in the bit error rate, the fault detection unit FDET outputs a retransmission error notification RERR1 to the link control unit LCLT, and when retry-out is detected, the fault detection unit FDET outputs a retransmission error notification RERR2 to the link control unit LCLT.

The link control unit LCLT includes an information acquisition unit ACQ and a selection unit SEL. The information acquisition unit ACQ receives the AM detection information AINF indicating the detection of an alignment marker that has been transmitted from the information processing device PDEV of the transmission source of data, from the interface unit PHY for every PCS lane. Further, the information acquisition unit ACQ receives the error information EINF indicating the detection of the results of a code error for the data that has been transmitted from the information processing device PDEV of the transmission source of data, from the interface unit PHY for every PCS lane.

The selection unit SEL specifies the physical lane PHL of a degeneration target based on either the AM detection information AINF or the error information EINF that has been received through the information acquisition unit ACQ. The physical lane PHL of the degeneration target is a physical lane PHL corresponding to the failed PCS lane or the failed physical lane PHL.

The selection unit SEL detects that failure occurs on the path (including components on the path) on any of the PCS lane and the physical lane PHL, based on the AM detection information AINF received through the information acquisition unit ACQ, during the start process before the link-up of the interface unit PHY. The selection unit SEL detects that failure occurs on the path of any of the PCS lane and the physical lane PHL, based on the error information EINF received through the information acquisition unit ACQ, after link-up of the interface unit PHY.

Further, the selection unit SEL detects that failure occurs on the path of any of the PCS lane and the physical lane PHL, based on a FCPE notification FERR and retransmission error notifications RERR1 and REER2, after link-up of the interface unit PHY.

Then, the selection unit SEL specifies the degenerated physical lane PHL, based on the detection result of a failure, and outputs the enable signal LEN corresponding to the specified physical lane PHL. In addition, the selection unit SEL specifies the physical lane PHL to be degenerated or the physical lane PHL for which the degeneration is to be released, based on the switching notification GRD from the CPU, before the link-up of the interface unit PHY or after the link-up of the interface unit PHY. The selection unit SEL outputs the enable signal LEN corresponding to the specified physical lane PHL.

The link control unit LCLT performs the control such as control of the interface unit PHY, the control of the link, the degeneration of physical lane PHL, or the like. For example, with respect to control of the interface unit PHY, the link control unit LCLT outputs an instruction notification SINF instructing the start of the interface unit PHY, to the interface unit PHY. In addition, the link control unit LCLT receives a start completion notification CINF indicating that the start of the interface unit PHY has been completed, from the interface unit PHY. In addition, the link control unit LCLT outputs an instruction notification SINF instructing the interface unit PHY to stop its operation, to the interface unit PHY.

For the control of the link, the link control unit LCLT performs a process of disconnecting the link based on the error notification from each functional block in the frame transfer unit FTR, and a process of notifying each function block of the state of the link. The degeneration of the physical lane PHL and the restoration of the degenerated physical lane PHL are performed by the link control unit LCLT. The link control unit LCLT receives the AM detection information AINF and error information EINF from the interface unit PHY. In addition, the link control unit LCLT outputs the enable signal LEN of the physical lane PHL to the interface unit PHY, and outputs the degeneration information DINFS to the frame generation unit FGEN.

Figure 5:
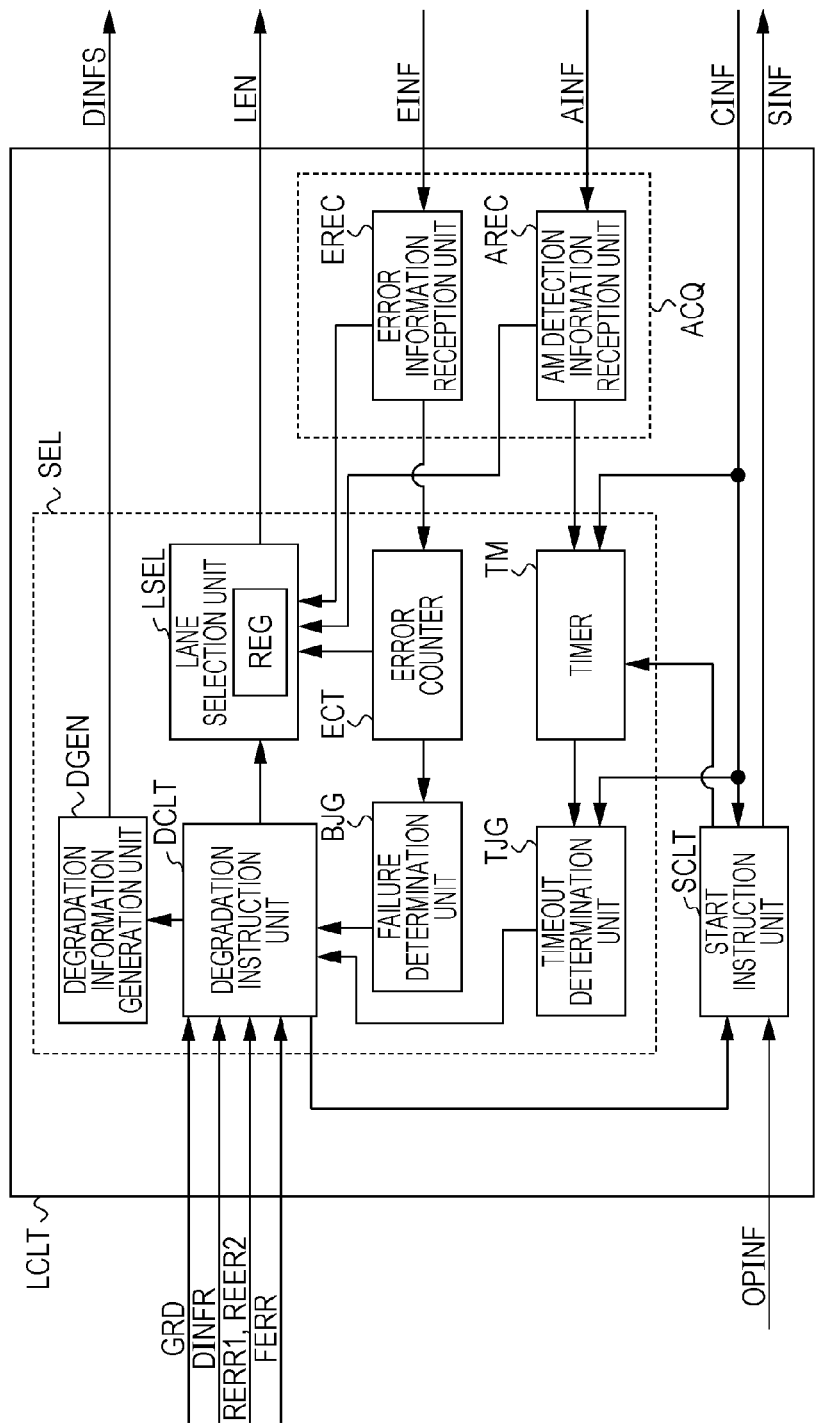
FIG. 5 is a diagram illustrating an example of a link control unit illustrated in FIG. 4.

FIG. 5 illustrates an example of the link control unit LCLT illustrated in FIG. 4. The link control unit LCLT includes a start instruction unit SCLT, an information acquisition unit ACQ, and a selection unit SEL. The information acquisition unit ACQ includes an error information reception unit EREC and an AM detection information reception unit AREC. The selection unit SEL includes a timer TM, a timeout determination unit TJG, an error counter ECT, a failure determination unit BJG, a degeneration instruction unit DCLT, a lane selection unit LSEL, and a degeneration information generation unit DGEN.

The start instruction unit SCLT receives a user instruction OPINF instructing the start of the interface unit PHY from the CPU. When detecting that the start or stop has been instructed to the interface unit PHY by the user operating the operation unit or the like of the information processing device PDEV, the CPU outputs the user instruction OPINF to the frame transfer unit FTR. The start instruction unit SCLT outputs the instruction notification SINF instructing the start of the interface unit PHY, to the interface unit PHY, based on the user instruction OPINF. In addition, when the start instruction for the interface unit PHY is, for example, the first instruction after the information processing device PDEV is turned on, the start instruction unit SCLT starts the timer TM. If the start of the interface unit PHY has been completed, the start instruction unit SCLT receives the start completion notification CINF indicating the completion of the start, from the interface unit PHY.

In addition, when receiving a user instruction OPINF instructing the stop of the interface unit PHY from the CPU, the start instruction unit SCLT outputs the instruction notification SINF instructing the stop of the interface unit PHY, to the interface unit PHY.

The start instruction unit SCLT receives a notification instructing the restart of the interface unit PHY from the degeneration instruction unit DCLT. In this case, the start instruction unit SCLT outputs, for example, the instruction notification SINF instructing the stop of the interface unit PHY, to the interface unit PHY, and then outputs the instruction notification SINF instructing the start of the interface unit PHY, to the interface unit PHY. In addition, the start instruction unit SCLT does not enable the timer TM at the time of restart.

The AM detection information reception unit AREC receives the AM detection information AINF of each PCS lane PLr from the interface unit PHY. Then, when receiving, for example, one or more pieces of AM detection information AINF indicating that the alignment marker has been detected, the AM detection information reception unit AREC outputs a start instruction signal for causing the timer TM to start measurement, to the timer TM.

In addition, the AM detection information reception unit AREC outputs the AM detection information AINF of each PCS lane PLr, to the lane selection unit LSEL. In addition, the AM detection information reception unit AREC may periodically read the AM detection information AINF from the interface unit PHY, by using, for example, the alignment detection information notification function which is defined in IEEE802.3ba standard.

For example, when receiving the start instruction signal from the AM detection information reception unit AREC, the timer TM starts the measurement of a predetermined time (for example, 4 ms). The timer TM stops the measurement in response to the start completion notification CINF received from the interface unit PHY. When the measurement of the predetermined time is ended, the timer TM outputs information indicating the elapse of the predetermined time, to the timeout determination unit TJG.

When the start completion notification CINF has not been received from the interface unit PHY until the predetermined time has elapsed, the timeout determination unit TJG determines that the failure of the physical lane PHL has occurred. Then, the timeout determination unit TJG outputs information indicating that the failure of the physical lane PHL has occurred, to the degeneration instruction unit DCLT.

The error information reception unit EREC receives the error information EINF of each PCS lane PLr from the interface unit PHY. The error information reception unit EREC outputs the error information EINF of each PCS lane PLr to the lane selection unit LSEL and the error counter ECT. In addition, the error information reception unit EREC may periodically read the number of errors which is obtained from the parity BIP from the interface unit PHY, by using, for example, the BIP error number notification function which is defined in IEEE802.3ba standard.

The error counter ECT calculates the number of parity BIP errors that has occurred for a predetermined period (for example, 80 milliseconds) for each physical lane PHL, based on the error information EINF of each PCS lane PLr that is received from the error information reception unit EREC. The error counter ECT outputs information indicating the number of parity BIP errors of each physical lane PHL, to the failure determination unit BJG and the lane selection unit LSEL. The error counter ECT is an example of a measurement unit that measures the number of errors that have occurred for a predetermined period (for example, the number of parity BIP errors) for each physical lane PHL, based on the error information EINF.

The failure determination unit BJG determines whether or not a failure has occurred in the physical lane PHL or the like (hereinafter, referred to as a lane failure), based on the information indicating the number of parity BIP errors for each physical lane PHL within the predetermined period. When it is determined that a failure has occurred, the failure determination unit BJG outputs the information indicating that the lane failure has occurred, to the degeneration instruction unit DCLT.

The degeneration instruction unit DCLT receives the switching notification GRD from the CPU illustrated in FIG. 2, receives the degeneration information DINFR from the frame reception unit FREC illustrated in FIG. 4, and receives the retransmission error notifications RERR1 and RERR2 from the fault detection unit FDET of the retransmission control unit RTCLT illustrated in FIG. 4. Further, the degeneration instruction unit DCLT receives the FCPE notification FERR from the error detection unit EDET of the flow control unit FCLT illustrated in FIG. 4, and receives the information indicating that the lane failure has occurred, from the timeout determination unit TJG and the failure determination unit BJG, respectively. The degeneration instruction unit DCLT outputs, for example, information indicating whether or not to execute the lane degeneration, to the lane selection unit LSEL.

In addition, when detecting the failure of a certain physical lane PHLr through which data is received, the degeneration instruction unit DCLT may output the information indicating the physical lane PHLr to be degenerated, and information indicating which physical lane PHLs degenerates through which data is transmitted, to the lane selection unit LSEL. In this case, for example, the physical lanes PHLr2 to PHLr3 and the physical lanes PHLs2 to PHLs3 corresponding to the physical lanes PHLr2 to PHLr3 are degenerated. The information indicating the physical lane PHLs to be degenerated and the information indicating the physical lane PHLr to be degenerated are transmitted as a control packet to the information processing device PDEV of the communication destination. The information processing device PDEV of the communication destination performs the degeneration of the physical lanes PHLs and PHLr.

Similarly, when any of the physical lanes PHLs through which data is transmitted is degenerated, the degeneration instruction unit DCLT may output the information indicating the physical lane PHLs to be degenerated and the information indicating which physical lane PHLr is to be degenerated through which data is received, to the lane selection unit LSEL. The degeneration of the physical lane PHLs is performed based on the degeneration instruction included in the control packet received from the information processing device PDEV of the communication destination. That is, the degeneration of the physical lane PHLs is performed, if the degeneration information DINFR is included in the control packet DLLP that has been received from a node of the communication partner (that is, if the node of the communication partner detects a failure in the physical PHLr through which data is received). In this case, for example, the physical lanes PHLs2 to PHLs3, and the physical lanes PHLr2 to PHLr3 corresponding to the physical lanes PHLs2 to PHLs3 are degenerated. In addition, the information processing device PDEV of the communication destination causes the physical lane PHLr based on the detection of an error and the physical lane PHLs to be degenerated.

Thus, the use of a predetermined number of physical lanes PHLr and PHLs is stopped in both the information processing devices PDEV1 and PDEV2, based on the detection of the error in the data received through the physical lane PHLr.

The degeneration instruction unit DCLT outputs information for executing the lane degeneration or information for releasing the lane degeneration, based on the reception of the switching notification GRD from the CPU, to the lane selection unit LSEL. Further, the degeneration instruction unit DCLT outputs the information for generating the degeneration information DINFS to be transmitted to the information processing device PDEV of the communication destination, to the degeneration information generation unit DGEN.

The lane selection unit LSEL includes a register REG provided with an area for storing information indicating the degeneration or the restoration of the lane, for each of the physical lanes PHLs0 to PHLs3, and PHLr0 to PHLr3. The lane selection unit LSEL sets the register REG, based on the information for executing lane degeneration and information for releasing the lane degeneration, which are received from the degeneration instruction unit DCLT. In other words, the register REG is set based on error information EINF and AINF, a FCPE notification FERR, retransmission error notifications RERR1 and RERR2, which are from the interface unit PHY, and a switching notification GRD from the CPU.

Without being particularly limited, in the register REG, an area corresponding to the physical lane PHL used for data transfer (does not degenerate) is set to logic 1, and an area corresponding to the physical lane PHL which is not used for data transfer (degenerate) is set to logic 0. Then, the lane selection unit LSEL, based on the information that has been set in the register REG, generates an enable signal LEN for enabling or disabling a physical lane PHL used for data transfer with the information processing device PDEV of the communication destination, and outputs it to the interface unit PHY.

The degeneration information generation unit DGEN generates degeneration information DINFS instructing the information processing device PDEV of the communication destination to execute lane degeneration or degeneration information DINFS instructing to determine a failure of the physical lane PHL, based on the information received from the degeneration instruction unit DCLT. The degeneration information generation unit DGEN outputs the degeneration information DINFS to the frame generation unit FGEN illustrated in FIG. 4. As a result, the degeneration information DINFS is transferred as degeneration information DINFR to the information processing device PDEV of the communication destination.

The configuration of the link control unit LCLT is not limited to this example. For example, the start instruction unit SCLT may enable the timer TM, even at the time of restart.

Figure 6:
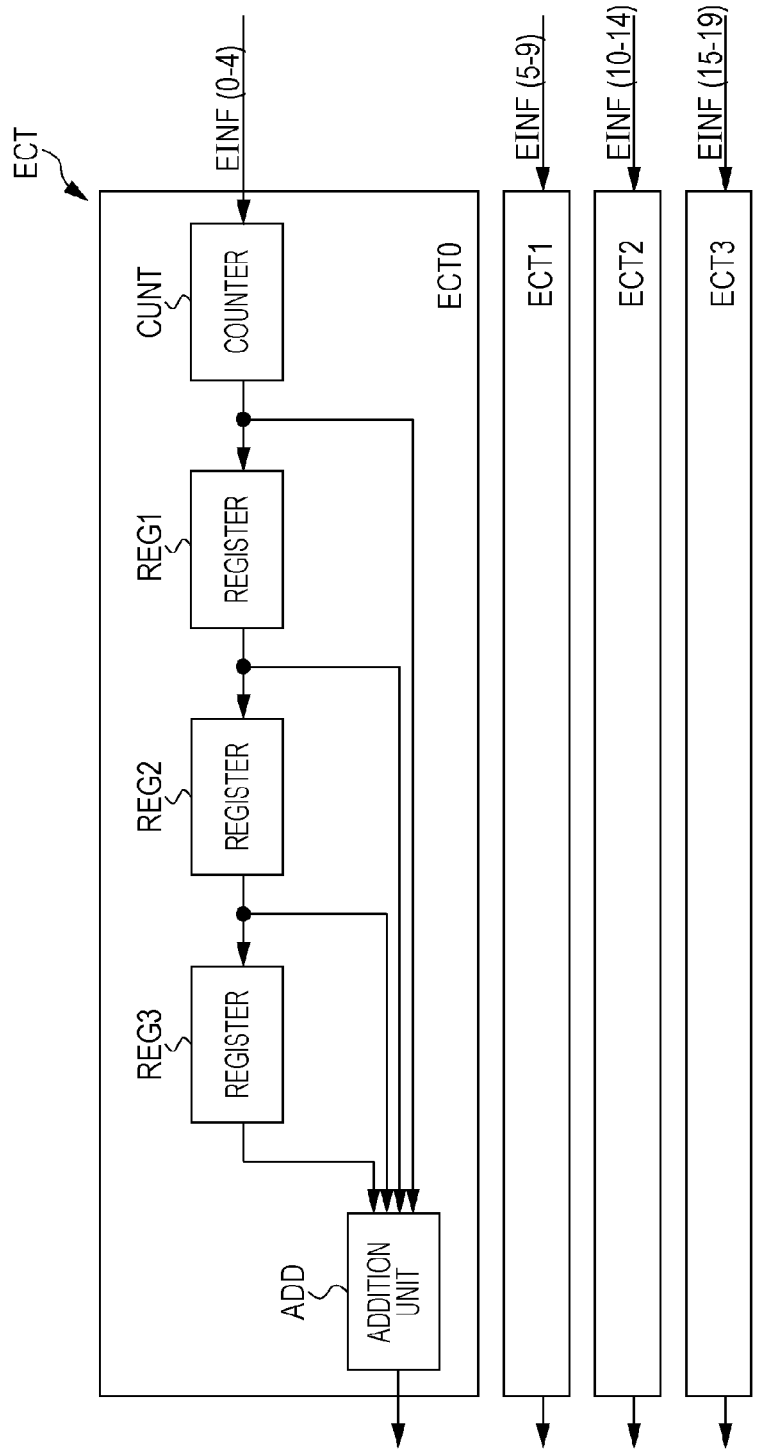
FIG. 6 is a diagram illustrating an example of an error counter illustrated in FIG. 5.

FIG. 6 illustrates an example of the error counter ECT illustrated in FIG. 5. The error counter ECT includes, for example, error counters ECT0, ECT1, ECT2, and ECT3. The error counters ECT0 to ECT3 count, for example, errors in the parity BIP within the predetermined period for each of the physical lanes PHLr0 to PHLr3. In addition, the number in parentheses at the end of the sign of the error information EINF illustrated in FIG. 6 correspond to, for example, the number at the end of the sign of each of the PCS lanes PLr0 to PLr19 illustrated in FIG. 3.

Since the configurations and operations of the error counters ECT0 to ECT3 are the same as or similar to each other, in FIG. 6, the error counter ECT0 will be explained. The error counter ECT0 measures the number of parity BIP errors of the physical lane PHLr0, which have occurred for about 80 milliseconds. For example, the error counter ECT0 starts the measurement based on the link-up of the interface unit PHY, and updates the measured value (the number of parity BIP errors that have occurred for about 80 milliseconds) at an interval of about 20 milliseconds.

The error counter ECT0 includes, for example, a counter CUNT, registers REG1, REG2, and REG3, and an addition unit ADD. Each of the counter CUNT and the registers REG1 and REG2 relays, for example, the held values to the registers REG1, REG2, and REG3 in the subsequent stage at an interval of about 20 milliseconds.

For example, in the transfer rate of 100 Gbps, it takes about 210 microseconds for the interface unit PHY to receive 16384 pieces of 64 B/66 B code blocks. In this case, for example, the counter CUNT adds the total number of parity BIP errors of the physical lane PHLr0 (the number of parity BIP errors of the PCS lanes PLr0 to PLr4) at an interval of about 210 microseconds. The counter CUNT transfers the added value (the number of parity BIP errors of the physical lane PHLr0 for about 20 milliseconds) to the register REG1 in the subsequent stage at an interval of about 20 milliseconds. In this case, the registers REG1 and REG2 also transfer the held value to the registers REG2 and REG3 in the subsequent stage.

In addition, the counter CUNT and the registers REG1, REG2, and REG3 output the held value to the addition unit ADD, for example, at a timing when the counter CUNT transfers the added value to the register REG1. For example, the counter CUNT outputs the number of parity BIP errors of the physical lane PHLr0 that have occurred for about 20 milliseconds from the present time to before about 20 milliseconds, to the addition unit ADD. Further, the register REG1 outputs the number of parity BIP errors of the physical lane PHLr0 that have occurred for about 20 milliseconds from about 20 milliseconds to before about 40 milliseconds, to the addition unit ADD. The register REG2 outputs the number of parity BIP errors of the physical lane PHLr0 that have occurred for about 20 milliseconds from about 40 milliseconds to before about 60 milliseconds, to the addition unit ADD. The register REG3 outputs the number of parity BIP errors of the physical lane PHLr0 that have occurred for about 20 milliseconds from about 60 milliseconds to before about 80 milliseconds, to the addition unit ADD.

The addition unit ADD adds the values which are received from the counter CUNT and the registers REG1, REG2, and REG3. As a result, the number of parity BIP errors of the physical lane PHLr0 that have occurred for about 80 milliseconds is calculated. The addition unit ADD outputs the addition result (the number of parity BIP errors of the physical lane PHLr0 that have occurred for about 80 milliseconds) to the failure determination unit BJG. In addition, the addition result which is output from the addition unit ADD is updated, for example, at an interval of about 20 milliseconds. Therefore, the failure determination unit BJG determines whether or not the failure occurs in the physical lane PHL at an interval of about 20 milliseconds.

The configuration of the error counter ECT and the numerical examples of the predetermined period are not limited to this example. For example, when the number of parity BIP errors of the physical lane PHLr that have occurred for about 40 milliseconds or the like is used for determination, the registers REG2 and REG3 may be omitted.

FIG. 7 is a diagram illustrating an example of a trigger for lane degeneration and a trigger for releasing the lane degeneration.

The lane degeneration is performed in response to detection of failure in the PCS lane PL and the physical lane PHL, during the start process prior to the link-up of the information processing device PDEV.

After the link-up of the information processing device PDEV, if the number of retransmissions within a unit time exceeds a threshold and the fault detection unit FDET outputs a retransmission error notification RERR1 based on the detection of deterioration in a bit error rate, the lane degeneration is performed. Further, after the link-up of the information processing device PDEV, if the number of continuous retransmissions exceeds a threshold and the fault detection unit FDET outputs a retransmission error notification RERR2 based on the detection of retry-out, the lane degeneration is performed. The retry-out is detected, for example, if there is no response (acknowledgment signal ACK or negative acknowledgment signal NACK) for the transmitted frame data SFRAM, or the number of continuous retransmissions exceeds a threshold.

After the link-up of the information processing device PDEV, if the flow control frame is not received over a predetermined period of time, and the flow control unit FCLT has output an FCPE notification FERR based on the detection of the flow control protocol error, the lane degeneration is performed. After the link-up of the information processing device PDEV, if the number of parity BIP errors within the predetermined period exceeds the threshold, the lane degeneration is performed.

In addition, before and after the link-up of the information processing device PDEV, if the switching notification GRD for switching the information processing device PDEV from the normal operation mode to the low power mode is output from the CPU (firmware), the lane degeneration is performed.

Meanwhile, before and after the link-up of the information processing device PDEV, if the switching notification GRD for switching the information processing device PDEV from the low power mode to the normal operation mode is output from the CPU, the release of the degenerated physical lane PHL is performed.

In addition, when the lane degeneration is performed due to the failure of the physical lane PHL or the PCS lane PL, after the failed component is replaced, the information processing system SYS1 is restarted. The information processing system SYS1 which has been restarted performs a link-up process by using all of the physical lanes PHL. Therefore, only when the information processing device PDEV is switched from the low power mode to the normal operation mode, the release of the degenerated physical lane PHL is performed.

Figure 8:
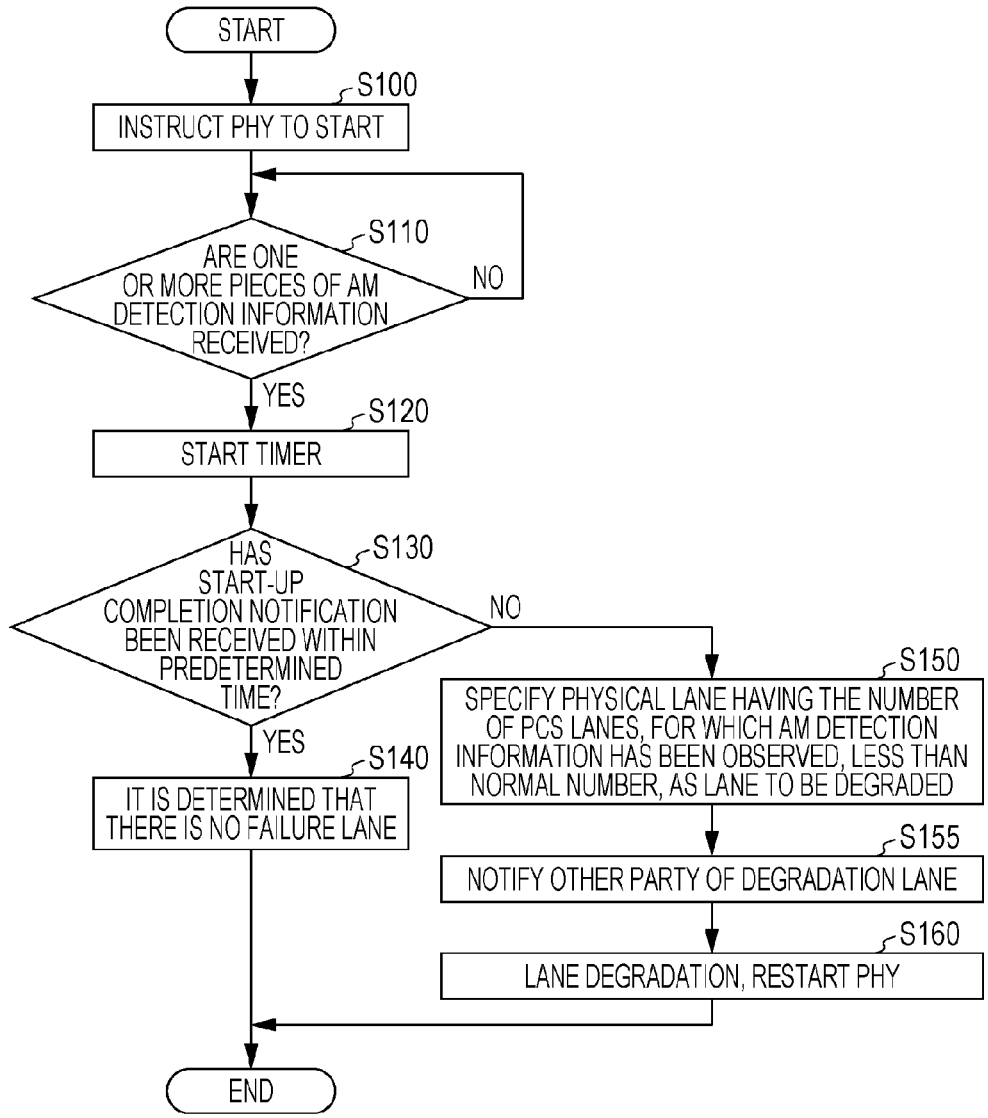
FIG. 8 is a diagram illustrating an example of an operation before link-up of the information processing device illustrated in FIG. 2.

FIG. 8 illustrates an example of an operation before link-up of the information processing device PDEV illustrated in FIG. 2. In addition, FIG. 8 illustrates an example of the operations of the frame transfer unit FTR illustrated in FIG. 4 and the link control unit LCLT illustrated in FIG. 5.

Both the information processing devices PDEV1 and PDEV2 illustrated in FIG. 2 perform the operation illustrated in FIG. 8 independently of each other. If the user instruction OPINF is received from the CPU illustrated in FIG. 2, the operation illustrated in FIG. 8 is performed by the link control unit LCLT illustrated in FIG. 4 and FIG. 5. In addition, the operation illustrated in FIG. 8 may be implemented by hardware, or may be implemented by software such as the control program performed by the CPU mounted in the frame transfer unit FTR.

In step S100, the start instruction unit SCLT instructs the interface unit PHY to perform a start process, depending on the user instruction OPINF instructing the start of the interface unit PHY. The interface unit PHY that has received the start instruction performs the start process, and starts transmitting and receiving link-up frames between interface units PHY.

Next, in step S110, the AM detection information reception unit AREC determines whether or not one or more pieces of AM detection information AINF are received, the AM detection information AINF being received together with the link-up frames. In other words, the AM detection information reception unit AREC determines whether or not the AM detection information AINF has been observed in one or more PCS lanes PL.

If one or more pieces of AM detection information AINF are received, the operation proceeds to step S120. Meanwhile, if one piece of AM detection information AINF is not also received, the operation returns to step S110.

In step S120, the timer TM starts measuring a predetermined time (for example, 4 ms) based on the observation of one or more PCS lanes PL having data including the alignment marker.

Next, in step S130, the timeout determination unit TJG determines whether or not a start completion notification CINF is received from the interface unit PHY, until a predetermined time has elapsed. In other words, the timeout determination unit TJG determines whether or not the alignment marker is detected in all PCS lanes PL until a predetermined time has elapsed since the alignment marker is first detected.

If the start completion notification CINF is received until the predetermined time has elapsed, the operation of the link control unit LCLT proceeds to step S140. Meanwhile, if the start completion notification CINF is not received until the predetermined time has elapsed, the operation proceeds to step S150.

In step S140, because the alignment marker is detected in all PCS lanes PL, the link control unit LCLT determines that there is no failure lane, and ends the process (hereinafter, referred to as the lane degeneration process) relating to lane degeneration, without performing the lane degeneration.

Meanwhile, in step S150, the lane selection unit LSEL specifies a physical lane for which the number of PCS lanes PL having the detected AM detection information AINF therein is less than a normal number (five pieces corresponding to one physical lane PHL in FIG. 3) as a physical lane PHL to be degenerated. For example, the physical lane PHL for which degeneration is specified is any of the physical lanes PHLr0 to PHLr3 on the reception side which receives the data. In addition, the lane selection unit LSEL may specify the physical lanes PHLr to be degenerated on the reception side, and the physical lanes PHLs on the transmission side corresponding to the physical lanes PHLr to be degenerated, as degeneration targets.

Next, in step S155, the frame transfer unit FTR transmits the degeneration information DINFS indicating the physical lane PHL (physical lane PHL to be degenerated) that has been specified in step S150, as a packet DLLP, to the information processing device PDEV of a communication destination. The frame transfer unit FTR of the information processing device PDEV of the communication destination receives the degeneration request packet DLLP including the degeneration information DINFS. The link control unit LCLT of the information processing device PDEV of the communication destination outputs an enable signal LEN to stop the use of the physical lane PHL which is indicated by the degeneration information DINFS (on the reception side, DINFR). For example, the physical lane PHL for which use has been stopped by the information processing device PDEV of the communication destination is any of the physical lanes PHLs0 to PHLs3 on the transmission side which transmits data. In addition, the information processing device PDEV of the communication destination may stop the use of the physical lane PHLr on the reception side corresponding to the physical lane PHLs to be degenerated on the transmission side, as well as any of the physical lanes PHLs on the transmission side. An example of the operation causing the information processing device PDEV of the communication destination to degenerate the physical lane PHL by step S155 is illustrated in FIG. 13.

Next, in step S160, the lane selection unit LSEL performs the lane degeneration, so as not to use the physical lane PHL (physical lane PHL to be degenerated) specified in step S150. The lane selection unit LSEL outputs the enable signal LEN to stop the use of the physical lane PHL (physical lane PHL to be degenerated) specified in step S150. Further, the lane selection unit LSEL selects the physical lane PHL for use in data transfer with the information processing device PDEV of the communication destination, from physical lanes PHL other than the specified physical lane PHL, and outputs the enable signal LEN to use the selected physical lane PHL. The interface unit PHY of the information processing device PDEV of the communication destination is restarted.

The degeneration instruction unit DCLT outputs a notification for instructing the restart of the interface unit PHY, to the start instruction unit SCLT. The start instruction unit SCLT instructs the interface unit PHY to perform restart, based on an instruction from the degeneration instruction unit DCLT.

In addition, in the restart of the interface unit PHY which is performed during the degeneration of the physical lane PHL, the contents which have been set in step S160 are taken over with respect to the setting for enabling the physical lane PHL (the value of the enable signal LEN). Further, in the link-up after the restart of the interface unit PHY which is performed during the degeneration of the physical lane PHL, since the physical lane PHL to be degenerated is determined before the restart, the operation illustrated in FIG. 8 is not performed.

From the above, even when using the interface unit PHY without a function of specifying a failed lane, the frame transfer unit FTR can specify the physical lane PHL to be degenerated before link-up by referring to the AM detection information AINF and the like. In addition, the information processing device PDEV may execute the lane degeneration process illustrated in FIG. 8, also during the restart of the interface unit PHY.

FIG. 9 illustrates an example of a method of specifying the physical lane PHL to be degenerated, in the operation before link-up illustrated in FIG. 8.

In the example illustrated in FIG. 9, in the physical lane PHLr0, the alignment markers are detected in all PCS lanes PLr0 to PLr4, and the number of PCS lanes PLr having the detected alignment markers therein is determined as "5". In the physical lane PHLr1, since the alignment markers are detected in all PCS lanes PLr5 to PLr9, the number of PCS lanes PLr having the detected alignment markers therein is determined as "5". In the physical lane PHLr2, since alignment markers are detected in all PCS lanes PLr10 to PLr14, the number of PCS lanes PLr having the detected alignment markers therein is determined as "5".

In the physical lane PHLr3, the alignment markers are detected in PCS lanes PLr15, and PLr17 to PLr19, and the alignment markers are not detected in a PCS lane PLr16. Therefore, the number of PCS lanes PLr having the detected alignment markers therein is determined as "4".

Therefore, in step S150 illustrated in FIG. 8, the lane selection unit LSEL specifies the physical lane PHLr3 for which the number of PCS lanes PLr having the detected alignment markers therein is less than a normal number "5" as a physical lane PHL to be degenerated. Meanwhile, the physical lanes PHLr0 to PHLr2 for which the number of PCS lanes PLr having the detected alignment markers therein is the normal number "5" as a normal physical lane PHL. In this way, the lane selection unit LSEL specifies a lane PHL to be degenerated based on the AM detection information AINF.

In addition, for example, in FIG. 9, if the alignment marker is not detected in at least one of the PCS lanes PLr10 to PLr14 corresponding to the physical lane PHLr2, the lane selection unit LSEL specifies the physical lane PHLr2 as a lane to be degenerated. In other words, the lane selection unit LSEL sets physical lanes PHLr including PCS lanes PLr without the detected alignment markers therein, as a degeneration target. Further, when there is a plurality of physical lanes PHLr including PCS lanes PLr without the detected alignment markers therein, the lane selection unit LSEL determines the plurality of physical lanes PHLr as the physical lane PHL to be degenerated.

FIG. 10 illustrates an example of the operation after link-up of the information processing device PDEV illustrated in FIG. 2. In the operation illustrated in FIG. 10, if the number of parity BIP errors within the predetermined period exceeds a threshold (for example, "the number of errors in parity BIP within predetermined period exceeding threshold" depicted in FIG. 7), the lane degeneration is performed.

Both the information processing devices PDEV1 and PDEV2 illustrated in FIG. 2 perform the operation illustrated in FIG. 10 independently of each other. If the frame transfer unit FTR illustrated in FIG. 4 receives the error information EINF from interface unit PHY, the operation illustrated in FIG. 10 is started. Incidentally, the operations illustrated in FIG. 10 may be implemented only by hardware or by software such as a control program performed by a CPU mounted in the frame transfer unit FTR.

In step S200, the error information reception unit EREC illustrated in FIG. 5 receives the error information EINF of each PCS lane PL from the interface unit PHY.

Next, in step S202, the error counter ECT illustrated in FIG. 5 measures the number of parity BIP errors for the past 80 milliseconds for each physical lane PHL. For example, the error counter ECT counts errors in the parity BIP of each physical lane PHL that have occurred for the past 80 milliseconds, with the reception of the error information EINF as a reference, and updates the count value at an interval of about 20 milliseconds.

Next, in step S204, the failure determination unit BJG illustrated in FIG. 5 determines whether or not there is a physical lane PHLr for which the number of parity BIP errors calculated in step S202 exceeds a threshold (for example, "255"). When there is the physical lane PHLr for which the number of parity BIP errors exceeds the threshold (when the trigger for lane degeneration is detected), the operation of the link control unit LCLT proceeds to step S206.

Meanwhile, in step S204, when there is no physical lane PHLr for which the number of parity BIP errors exceeds the threshold, the operation of the link control unit LCLT returns to step S200. In other words, when the number of parity BIP errors for the past 80 milliseconds is the threshold or less in all physical lanes PHLr, the operation of the link control unit LCLT returns to step S200.

In step S206, the lane selection unit LSEL illustrated in FIG. 5 specifies the physical lane PHLr for which the number of parity BIP errors for the past 80 milliseconds exceeds threshold, as a lane to be degenerated. For example, the physical lane PHL for which degeneration is specified is any of the physical lanes PHLr0 to PHLr3 on the reception side which receives the data. In addition, the lane selection unit LSEL may specify the physical lanes PHLr to be degenerated on the reception side, and the physical lanes PHLs on the transmission side corresponding to the physical lanes PHLr to be degenerated, as degeneration targets.

The failure determination unit BJG notifies the degeneration instruction unit DCLT that there is the physical lane PHL to be degenerated. Thus, the degeneration instruction unit DCLT instructs the lane selection unit LSEL so as to cause the physical lane PHL to be degenerated which has the number of parity BIP errors exceeding the threshold.

Then, the lane selection unit LSEL determines the physical lane PHL to be degenerated, based on, for example, the number of parity BIP errors calculated by the error counter ECT in step S202. In addition, the lane selection unit LSEL may receive the information indicating the physical lane PHL having the number of parity BIP errors for the past 80 milliseconds exceeding the threshold, from the failure determination unit BJG.

Next, in step S208, the frame transfer unit FTR transmits the degeneration information DINFS indicating the physical lane PHL (physical lane PHL to be degenerated) that has been specified in step S206, as a packet DLLP, to the information processing device PDEV of a communication destination. The frame transfer unit FTR of the information processing device PDEV of the communication destination receives the degeneration request packet DLLP including the degeneration information DINFS. The link control unit LCLT of the information processing device PDEV of the communication destination outputs an enable signal LEN to stop the use of the physical lane PHL on the transmission side which is indicated by the degeneration information DINFS (on the reception side, DINFR). For example, the physical lane PHL for which use has been stopped by the information processing device PDEV of the communication destination is any of the physical lanes PHLs0 to PHLs3 on the transmission side which transmits data. In addition, the information processing device PDEV of the communication destination may stop the use of the physical lane PHLr on the reception side corresponding to the physical lane PHLs to be degenerated on the transmission side, as well as any of the physical lanes PHLs on the transmission side. An example of the operation causing the information processing device PDEV of the communication destination to degenerate the physical lane PHL by step S208 is illustrated in FIG. 13.

In step S210, in the same manner as in step S160 illustrated in FIG. 8, the link control unit LCLT performs the lane degeneration, and instructs the interface unit PHY to restart. In other words, the lane selection unit LSEL outputs the enable signal LEN to stop the use of the physical lane PHLr (physical lane PHLr to be degenerated) specified in step S206. In addition, the lane selection unit LSEL selects the physical lane PHLr through which data is received from the information processing device PDEV of a communication destination, among the physical lanes PHLr other than the physical lane PHLr to be degenerated, and outputs an enable signal LEN to enable the selected physical lane PHLr. The frame transfer unit FTR restarts the interface unit PHY.

In addition, when the operation illustrated in FIG. 10 is performed after the degeneration of the physical lane PHL is already performed, the physical lane PHL for which use has been stopped before the execution of the operation illustrated in FIG. 10 is not included in the selection target physical lane PHL. In this case, the selection target physical lane PHL is the physical lane PHL obtained by excluding the physical lanes PHL specified in step S206 (physical lane PHL to be degenerated) from the physical lanes PHL that have been used before the execution of the operation illustrated in FIG. 10.

In addition, in the restart of the interface unit PHY which is performed due to lane degeneration, the contents which have been set in step S210 are taken over with respect to the setting for enabling the physical lane PHL (the value of the enable signal LEN). Further, in the link-up after the restart of the interface unit PHY which is performed during the line degeneration, since the physical lane PHL to be degenerated is determined before the restart, the operation illustrated in FIG. 8 is not performed.

In the operation illustrated in FIG. 10, the lane selection unit LSEL specifies degeneration of the physical lane PHL to be degenerated, based on the error information EINF indicating that there is an error in data transmitted from the information processing device PDEV of a communication destination to the interface unit PHY. Therefore, even when using the interface unit PHY without a function of specifying a failed lane, the frame transfer unit FTR can specify the physical lane PHL to be degenerated after link-up by referring to the error information EINF and the like.

FIG. 11 illustrates another example of the operation of the information processing device PDEV after link-up illustrated in FIG. 2. In the operation illustrated in FIG. 11, if the fault in the retransmission process (for example, "deterioration in a bit error rate" or "detection of retry-out" depicted in FIG. 7) is detected, the lane degeneration is performed.

Both the information processing devices PDEV1 and PDEV2 illustrated in FIG. 2 perform the operation illustrated in FIG. 11 independently of each other. The operation illustrated in FIG. 11 is performed by the frame transfer unit FTR illustrated in FIG. 4. In addition, the operation illustrated in FIG. 11 may be implemented only by hardware or by software such as a control program performed by the CPU mounted in the frame transfer unit FTR.

In FIG. 11, steps S302 and S304 correspond to the process of detecting the trigger of lane degeneration, and are repeatedly performed by the fault detection unit FDET after the link-up. Steps S310 to S322 are performed by the link control unit LCLT based on the detection of a fault in the retransmission process by the fault detection unit FDET.

In step S302, the fault detection unit FDET illustrated in FIG. 4 determines whether or not fault has occurred in the process related to retransmission (retransmission process), based on the packet DLLP that the frame reception unit FREC has received from the information processing device PDEV of the communication destination. For example, when deterioration in a bit error rate or retry-out is detected, the fault detection unit FDET determines that fault has occurred in the retransmission process.

For example, when retransmission requests (NACK)) of a threshold (for example, 255) or more times during a predetermined time (24 seconds) are received from the information processing device PDEV of the communication destination, the fault detection unit FDET determines the deterioration in the bit error rates. In addition, when either the acknowledgment signal ACK or the negative acknowledgment signal NACK has not been received until a predetermined time (for example, 12.62 milliseconds) has elapsed since the frame data SFRAM is transmitted, the fault detection unit FDET determines retry-out. Alternatively, when the number of continuous retransmission requests exceeds a threshold (for example, 255 times), the fault detection unit FDET determines retry-out.

If the fault occurs in the retransmission processing, the operations of the fault detection unit FDET, the process proceeds to step S304, if the fault is not generated in the retransmission processing, the operation of the fault detection unit FDET returns to step S302. In other words, when the fault in the retransmission process has not occurred, the fault detection unit FDET continues the process of detecting the fault in the retransmission process, in step S302.

In step S304, when the deterioration of bit error rate is detected, the fault detection unit FDET transmits the retransmission error notification RERR1 to the link control unit LCLT, and when the retry-out is detected, the fault detection unit FDET transmits the retransmission error notification RERR2 to the link control unit LCLT.

Meanwhile, in step S310, the degeneration instruction unit DCLT of the link control unit LCLT receives any of the retransmission error notifications RERR1 and REER2 from the fault detection unit FDET. Thus, the link control unit LCLT starts the lane degeneration process when fault occurs in the retransmission process.

Next, in step S312, in the same manner as in step S204 illustrated in FIG. 10, the failure determination unit BJG illustrated in FIG. 5 determines whether or not there is a physical lane PHL having the number of parity BIP errors of data that is received from the information processing device PDEV of the communication destination exceeding a threshold within a predetermined period. In other words, it is identified whether the fault occurred in the retransmission process is due to the physical lane PHLr through which data is received from the information processing device PDEV of a communication destination or due to the physical lane PHLs through which data is transmitted to the information processing device PDEV of a communication destination. In addition, the link control unit LCLT counts the number of parity BIP errors within a predetermined period, by using the error counter ECT for each physical lane PHL, in parallel with the operation illustrated in FIG. 11. For example, the number of parity BIP errors of each physical lane PHL in the predetermined period is calculated in step S202 of FIG. 10.

If there is the physical lane PHLr having the number of parity BIP errors exceeding the threshold, it is determined that there is a high possibility of the existence of a failure in the physical lane PHLr or the like through which data is received from the information processing device PDEV of a communication destination, and the operation of the link control unit LCLT proceeds to step S314. Meanwhile, if there is no physical lane PHLr having the number of parity BIP errors exceeding the threshold, it is determined that there is a high possibility of the existence of a failure in the physical lane PHLs or the like through which data is transmitted to the information processing device PDEV of the communication destination, and the operation of the link control unit LCLT proceeds to step S318. In addition, the threshold of step S312 may be the same value as the threshold of the step S204 of FIG. 10, or may be a different value therefrom.

In step S314, the lane selection unit LSEL illustrated in FIG. 5 specifies the physical lane PHLr having the greatest number of parity BIP errors within the predetermined period, as the physical lane PHL to be degenerated. In addition, the lane selection unit LSEL may specify the physical lanes PHLr to be degenerated on the reception side, and the physical lanes PHLs on the transmission side corresponding to the physical lanes PHLr to be degenerated, as degeneration targets. For example, the lane selection unit LSEL specifies the physical lane PHL to be degenerated due to the detection of a failure, based on the number of parity BIP errors within the predetermined period (for example, during the past 80 milliseconds). In other words, when fault in the process related to retransmission is detected, the lane selection unit LSEL specifies the physical lane PHL to be degenerated, based on the error information EINF for a predetermined period.

In this case, as compared to the case of specifying the physical lane PHL to be degenerated based on the parity BIP immediately before a fault is detected in the retransmission process, the lane selection unit LSEL can accurately specify the physical lane PHL to be degenerated due to a failure, without being affected from noise or the like. Hereinafter, the specification accuracy when specifying the physical lane PHL to be degenerated due to a failure is also referred to as a specification accuracy of a lane to be degenerated.

Next, in step S316, in the same manner as in step S208 illustrated in FIG. 10, the frame transfer unit FTR transmits the degeneration information DINFS indicating the physical lane PHL that has been specified in step S314, as a packet DLLP, to the information processing device PDEV of a communication destination. The link control unit LCLT of the information processing device PDEV of the communication destination outputs an enable signal LEN to stop the use of the physical lane PHL on the reception side which is indicated by the packet DLLP (degeneration request) including the degeneration information DINFS. Here, the physical lane PHL for which use has been stopped by the information processing device PDEV of the communication destination is any of the physical lanes PHLs0 to PHLs3 on the transmission side which transmits data. In addition, the information processing device PDEV of the communication destination may stop the use of the physical lane PHLr on the reception side corresponding to the physical lane PHLs to be degenerated on the transmission side, as well as any of the physical lanes PHLs on the transmission side. After step S316, the operation proceeds to step S322.

Meanwhile, in step S318, the link control unit LCLT transmits, to the information processing device PDEV of a communication destination, a degeneration lane specification request for determining the failure of the physical lane PHLs or the like through which data is transmitted to the information processing device PDEV of the communication destination. For example, the degeneration information generation unit DGEN outputs the degeneration information DINFS for making a request for specification of a physical lane PHLs to be degenerated to the information processing device PDEV of the communication destination, and to the frame generation unit FGEN. Here, the physical lane PHLs through which data is transmitted to the information processing device PDEV of the communication destination is a physical lane PHLr through which the data is received, in the information processing device PDEV of the communication destination.

The information processing device PDEV of the communication destination which has received the degeneration lane specification request performs the process for specifying the physical lane PHLr to be degenerated. The information processing device PDEV of the communication destination which has specified the physical lane PHLr to be degenerated transmits a degeneration request packet DLLP including the degeneration information DINFS indicating the physical lane PHLr to be degenerated, to the information processing device PDEV which is the request source of the lane degeneration process. The information processing device PDEV which is the request source of the lane degeneration process is the information processing device PDEV that has transmitted the degeneration lane specification request packet DLLP. Thus, the frame reception unit FREC illustrated in FIG. 4 receives the degeneration request packet DLLP which is a response to the degeneration lane specification request packet DLLP, from the information processing device PDEV of the communication destination. In addition, the information processing device PDEV of the communication destination that has received the degeneration lane specification request may specify the physical lanes PHLr to be degenerated on the reception side, and the physical lanes PHLs on the transmission side corresponding to the physical lanes PHLr to be degenerated, as degeneration targets.

Next, in step S320, the degeneration instruction unit DCLT receives the degeneration information DINFS (degeneration request) for requesting the degeneration, as a result of the lane degeneration process that is requested to the information processing device PDEV of the communication destination in step S318. Thus, the lane selection unit LSEL can select a physical lane PHL and the like to be used for data transfer.

In step S322, the link control unit LCLT performs the lane degeneration, and instructs the interface unit PHY to restart. For example, the lane selection unit LSEL outputs the enable signal LEN to stop the use of the physical lane PHLr (physical lane PHLr to be degenerated) specified in step S314. In addition, the lane selection unit LSEL selects the physical lane PHLr through which data is received from the information processing device PDEV of the communication destination, among the physical lanes PHLr other than the physical lane PHLr to be degenerated, and outputs an enable signal LEN to enable the selected physical lane PHLr. In addition, the lane selection unit LSEL may output an enable signal LEN to stop the use of the physical lane PHLs to be degenerated, as well as an enable signal LEN to stop the use of the physical lane PHLr.

Alternatively, the lane selection unit LSEL outputs the enable signal LEN to stop the use of the physical lane PHLs to be degenerated that is included in the degeneration information DINFS which is received in step S320. In this case, the lane selection unit LSEL may output an enable signal LEN to stop the use of the physical lane PHLr as well as the enable signal LEN to stop the use of the physical lane PHLs.

In addition, when the operation illustrated in FIG. 11 is performed after the degeneration of the physical lane PHL is already performed, the physical lane PHL for which use has been stopped before the execution of the operation illustrated in FIG. 11 is not included in the selection target physical lane PHL. In this case, the selection target physical lane PHL is the physical lane PHL obtained by excluding the physical lanes PHL specified in step S314 (physical lane PHL to be degenerated) from the physical lanes PHL that have been used before the execution of the operation illustrated in FIG. 11.

Further, the degeneration instruction unit DCLT outputs a notification for instructing the restart of the interface unit PHY, to the start instruction unit SCLT. Then, the start instruction unit SCLT instructs the interface unit PHY to perform restart, in response to the instruction of the restart from the degeneration instruction unit DCLT.

In addition, in the restart of the interface unit PHY which is performed during the degeneration of the physical lane PHL, the contents which have been set in step S322 are taken over with respect to the setting for enabling the physical lane PHL (the value of the enable signal LEN). Further, in the link-up after the restart of the interface unit PHY which is performed during the degeneration of the physical lane PHL, since the physical lane PHL to be degenerated is determined before the restart, the operation illustrated in FIG. 8 is not performed.

From the above, even when using the interface unit PHY without a function of specifying a failed lane, if fault is detected in the retransmission process, the frame transfer unit FTR can specify the physical lane PHL to be degenerated after link-up, based on the error information EINF or the like.

The operation after the link-up of the information processing device PDEV is not limited to this example. For example, the lane selection unit LSEL may specify the physical lane PHL to be degenerated, based on the number of parity BIP errors at a time when fault in the retransmission process is detected, or immediately before or after the time.

FIG. 12 illustrates another example of the operation of the information processing device PDEV after the link-up illustrated in FIG. 2. In the operation illustrated in FIG. 12, if the fault in the flow control for transmitting data to the information processing device PDEV of the communication destination (for example, "detection of the flow control protocol error" depicted in FIG. 7) is detected, the lane degeneration is performed.

Both the information processing devices PDEV1 and PDEV2 illustrated in FIG. 2 perform the operation illustrated in FIG. 12 independently of each other. The operation illustrated in FIG. 12 is performed by the frame transfer unit FTR illustrated in FIG. 4. In addition, the operation illustrated in FIG. 12 may be implemented only by hardware, or may be implemented by software such as the control program performed by the CPU mounted in the frame transfer unit FTR.

In FIG. 12, steps S402 and S404 correspond to the process of detecting the trigger of lane degeneration, and are performed by the error detection unit EDET. Steps S410 to S422 are performed by the link control unit LCLT.

In step S402, the error detection unit EDET illustrated in FIG. 4 determines whether or not to detect the FCPE. For example, if the length of the period when the flow control frame (flow control information FINF) is not received exceeds the threshold (for example, 200 microseconds), the error detection unit EDET detects the occurrence of FCPE.

If the FCPE is detected, the operation of the error detection unit EDET proceeds to step S404. Meanwhile, if the FCPE is not detected, the operation of the error detection unit EDET returns to step S402. In other words, if fault has not occurred in the flow control, the error detection unit EDET continues the process of detecting the fault in the flow control.

In step S404, error detection unit EDET outputs FCPE notification FERR indicating that the fault has occurred in the flow control to the link control unit LCLT. As a result, link control unit LCLT, in step S410, receives the FCPE notification FERR.

In step S410, the degeneration instruction unit DCLT of the link control unit LCLT illustrated in FIG. 5 receives the FCPE notification FERR from the error detection unit EDET, and starts the lane degeneration process in the case where fault occurs in the flow control.

Next, in step S412, in the same manner as in step S312 illustrated in FIG. 11, the failure determination unit BJG illustrated in FIG. 5 determines whether or not there is a physical lane PHLr for which the number of parity BIP errors of data from the information processing device PDEV of the communication destination exceeds a threshold within a predetermined period. If there is the physical lane PHLr for which the number of parity BIP errors exceeds the threshold, it is determined that the FCPE has occurred due to a failure of the physical lane PHLr or the like through which data from the information processing device PDEV of the communication destination is received, and the operation of the link control unit LCLT proceeds to step S414. Meanwhile, even if there is no physical lane PHLr for which the number of parity BIP errors exceeds the threshold, it is determined that there is a high possibility of the occurrence of the FCPE due to a failure of the physical lane PHLr or the like through which data from the information processing device PDEV of the communication destination is received. In this case, the operation of the link control unit LCLT proceeds to step S418. In addition, the threshold of step S412 may be the same value as the threshold of the step S204 of FIG. 10, or may be a different value therefrom.

In step S414, in the same manner as in step S314 illustrated in FIG. 11, the lane selection unit LSEL specifies the physical lane PHLr having the greatest number of parity BIP errors within the predetermined period, as the lane to be degenerated. In addition, the lane selection unit LSEL may specify the physical lanes PHLr to be degenerated on the reception side, and the physical lanes PHLs on the transmission side corresponding to the physical lanes PHLr to be degenerated, as degeneration targets. Here, the detection time interval of the FCPE (for example, 4.5 microseconds) is shorter than the detection time interval of the parity BIP error (for example, 210 microseconds). Therefore, when the FCPE is detected based on a fixed failure, there is a concern that the history of the parity BIP errors (the number of parity BIP errors within a predetermined period) may not fully reflect the situation up to the detection of the FCPE. Therefore, if the physical lane PHLr to be degenerated is specified based on the history of the parity BIP error, there is a possibility that the specification accuracy of the physical lane PHLr to be degenerated is reduced. Therefore, for example, when executing the process of steps S412 and S414, the lane selection unit LSEL refers to detection information (error information EINF) on the parity BIP errors at a time when FCPE is detected, or immediately before or after the time. After step S414, the operation proceeds to step S416.

Meanwhile, in step S418, since there is no difference in the number of the parity BIP errors between the physical lanes PHLr through which data is received, the lane selection unit LSEL specifies the specific physical lane PHLr as a lane to be degenerated. For example, the specific physical lanes PHLr are selected according to a predetermined order. In addition, in step S418, if the number of parity BIP errors within the predetermined period is one or more and is a threshold or less, the lane selection unit LSEL may specify the physical lane PHLr having the greatest number of parity BIP errors within the predetermined period, as the physical lane PHL to be degenerated. In addition, the lane selection unit LSEL may specify the physical lanes PHLr to be degenerated on the reception side, and the physical lanes PHLs on the transmission side corresponding to the physical lanes PHLr to be degenerated, as degeneration targets.

After the operation illustrated in FIG. 12, when the FCPE is detected again, the degeneration of the physical lane PHLr selected in step S418 in the previous operation is released, and in step S418, a new physical lane PHLr is selected. In other words, despite of the detection of the FCPE, if there is no difference in the number of parity BIP errors, the physical lanes PHLr are alternately selected until the FCPE is no longer detected.

Next, in step S416, the frame transfer unit FTR transmits the degeneration information DINFS indicating the physical lane PHL (physical lane PHL to be degenerated) that has been specified in step S414 or step S418, as a packet DLLP, to the information processing device PDEV of a communication destination. The operation of the step S416 is similar to the operation of step S208 illustrated in FIG. 10. The link control unit LCLT of the information processing device PDEV of the communication destination which is notified of a degeneration lane outputs an enable signal LEN to stop the use of the physical lane PHL which is indicated by the packet DLLP (degeneration request) including the degeneration information DINFS.

Next, in step S422, in the same manner as in step S210 illustrated in FIG. 10, the link control unit LCLT performs the lane degeneration, and instructs the interface unit PHY to restart. For example, the lane selection unit LSEL outputs an enable signal LEN to stop the use of the physical lane PHLr (physical lane PHLr to be degenerated) specified in step S414 or step S418. In addition, the lane selection unit LSEL selects the physical lane PHLr through which data is received from the information processing device PDEV of the communication destination, among the physical lanes PHLr other than the physical lane PHLr to be degenerated, and outputs an enable signal LEN to enable the selected physical lane PHLr. Then, the frame transfer unit FTR restarts the interface unit PHY.

In addition, for example, when the operation illustrated in FIG. 12 is performed after the degeneration of the physical lane PHL is already performed, the physical lane PHL for which use has been stopped before the execution of the operation illustrated in FIG. 12 is not included in the selection target physical lane PHL. In this case, the selection target physical lane PHL is the physical lane PHL obtained by excluding the physical lanes PHL specified in step S414 or step S418 (physical lane PHL to be degenerated) from the physical lanes PHL that have been used before the execution of the operation illustrated in FIG. 12.

Further, the degeneration instruction unit DCLT outputs a notification for instructing the restart of the interface unit PHY, to the start instruction unit SCLT. Then, the start instruction unit SCLT instructs the interface unit PHY to restart, in response to, for example, the instruction of the restart from the degeneration instruction unit DCLT.

Thus, for example, if the fault in the flow control is detected, the lane selection unit LSEL selects the physical lane PHL for use in data transfer with the external device, based on the error information EINF.

In addition, in the restart of the interface unit PHY which is performed during the degeneration of the physical lane PHL, the contents which have been set in step S422 are taken over with respect to the setting for enabling the physical lane PHL (the value of the enable signal LEN). Further, in the link-up after the restart of the interface unit PHY which is performed during the degeneration of the physical lane PHL, since the physical lane PHL to be degenerated is determined before the restart, the operation illustrated in FIG. 8 is not performed.

From the above, even when using the interface unit PHY without a function of specifying a failed lane, if fault is detected in the flow control, the frame transfer unit FTR can specify the physical lane PHL to be degenerated after link-up, based on the error information EINF or the like.

The operation after the link-up of the information processing device PDEV is not limited to this example. For example, the process of step S418 may be omitted. In this case, for example, step S412 may be repeated until the parity BIP error is detected. In addition, in step S412, if there is no physical lane PHL having the number of parity BIP errors exceeding the threshold, the frame transfer unit FTR may execute the same operations as step S318 and S320 illustrated in FIG. 11, instead of step S418.

FIG. 13 illustrates another example of the operation of the information processing device PDEV after the link-up illustrated in FIG. 2. In the operation illustrated in FIG. 13, the degeneration of the physical lane PHLs is performed based on the reception of the degeneration request for the physical lane PHLs from the information processing device PDEV of a communication destination that has detected the trigger of the degeneration of the physical lane PHLr. Alternatively, the degeneration of the physical lane PHLr is performed based on the reception of the degeneration lane specification request for requesting the degeneration of the failed physical lane PHLr from the information processing device PDEV of a communication destination.

Both the information processing devices PDEV1 and PDEV2 illustrated in FIG. 2 perform the operation illustrated in FIG. 13 independently of each other. In FIG. 13, steps S502 and S504 correspond to the process of detecting trigger for lane degeneration, and are performed by the frame reception unit FREC illustrated in FIG. 4. In addition, steps S510 to S522 are performed by the link control unit LCLT illustrated in FIG. 4 and FIG. 5. In addition, the operation illustrated in FIG. 13 may be implemented only by hardware, or may be implemented by software such as the control program performed by the CPU mounted in the frame transfer unit FTR.

In step S502, the frame reception unit FREC determines whether or not the control packet DLLP including the degeneration information DINFR is received. The degeneration information DINFR included in the control packet DLLP is a degeneration request packet DLLP for indicating the physical lane PHL to be degenerated or a degeneration lane specification request packet DLLP instructing the detection of the physical lane PHL to be degenerated.

When the degeneration request packet DLLP or the degeneration lane specification request packet DLLP is received, the operation of the frame reception unit FREC proceeds to step S504. Meanwhile, when either the degeneration request packet DLLP or the degeneration lane specification request packet DLLP is not received, the operation of the frame reception unit FREC returns to step S502.

In step S504, the frame reception unit FREC outputs the degeneration information DINFR that is included in the degeneration request packet DLLP or the degeneration lane specification request packet DLLP which is received in step S502, to the link control unit LCLT illustrated in FIG. 4. As a result, the link control unit LCLT receives the degeneration information DINFR, in step S510.

In step S510, the degeneration instruction unit DCLT of the link control unit LCLT receives the degeneration information DINFR from the frame reception unit FREC. As a result, the link control unit LCLT starts a lane degeneration process when a trigger of the lane degeneration is detected in the information processing device PDEV of a communication destination.

Next, in step S511, the degeneration instruction unit DCLT determines whether or not the degeneration information DINFR received in step S510 indicates the degeneration lane specification request instructing the detection of a physical lane PHLr to be degenerated. When the degeneration information DINFR indicates a degeneration lane specification request, the operation of the link control unit LCLT proceeds to step S512. Meanwhile, when the degeneration information DINFR is not the degeneration lane specification request (in other words, in the case of a degeneration request instructing the physical lane PHL to be degenerated), the operation of the link control unit LCLT proceeds to step S522.

Next, in step S512, in the same manner as in step S204 illustrated in FIG. 10, the failure determination unit BJG determines whether or not there is a physical lane PHLr for which the number of parity BIP errors of data that is received from the information processing device PDEV of the communication destination exceeds a threshold within a predetermined period. In addition, the link control unit LCLT counts the number of parity BIP errors within a predetermined period, by using, for example, the error counter ECT for each physical lane PHL, in parallel with the operation illustrated in FIG. 13. For example, the number of parity BIP errors of each physical lane PHL within the predetermined period is calculated in step S202 of FIG. 10.

If there is the physical lane PHLr having the number of parity BIP errors exceeding the threshold, the operation of the link control unit LCLT proceeds to step S514. Meanwhile, if there is no physical lane PHLr having the number of parity BIP errors exceeding the threshold, the operation of the link control unit LCLT proceeds to step S518. In addition, the threshold of step S512 may be the same value as the threshold of the step S204 in FIG. 10, or may be a different value therefrom.

In step S514, in the same manner as in step S314 illustrated in FIG. 11, the lane selection unit LSEL illustrated in FIG. 5 specifies the physical lane PHLr having the greatest number of parity BIP errors within the predetermined period, as the lane to be degenerated. In addition, the lane selection unit LSEL may specify the physical lane PHLr to be degenerated on the reception side and the physical lane PHLs on the transmission side corresponding to the physical lane PHLr to be degeneration, as degeneration targets. After the step S514, the operation proceeds to step S520.

Meanwhile, in step S518, in the same manner as in step S418 illustrated in FIG. 12, since there is no difference in the number of the parity BIP errors between the physical lanes PHLr through which data is received, the lane selection unit LSEL specifies the specific physical lane PHLr as a lane to be degenerated. For example, the specific physical lanes PHLr are selected according to a predetermined order. In addition, in step S518, if the number of parity BIP errors within the predetermined period is one or more and is a threshold or less, the lane selection unit LSEL may specify the physical lane PHLr having the greatest number of parity BIP errors within the predetermined period, as the lane to be degenerated. In addition, lane selection unit LSEL may specify the physical lanes PHLr to be degenerated on the reception side, and the physical lanes PHLs on the transmission side corresponding to the physical lanes PHLr to be degenerated, as degeneration targets.

Next, in step S520, the frame transfer unit FTR transmits the degeneration information DINFS indicating the physical lane PHL (physical lane PHL to be degenerated) that has been specified in step S514 or step S518, as a packet DLLP, to the information processing device PDEV of a communication destination. The operation of step S520 is similar to the operation of step S208 illustrated in FIG. 10. The link control unit LCLT of the information processing device PDEV of the communication destination which is notified of the lane to be degenerated outputs the enable signal LEN to stop the use of the physical lane PHL which is indicated by the packet DLLP (degeneration request) including the degeneration information DINFS.

In step S522, in the same manner as in step S210 illustrated in FIG. 10, the link control unit LCLT performs the lane degeneration, and instructs the interface unit PHY to restart. For example, the lane selection unit LSEL outputs the enable signal LEN to stop the use of the physical lane PHL (physical lane PHL to be degenerated) specified in step S514 or step S518. In addition, the lane selection unit LSEL selects the physical lane PHL through which data is received or transmitted, among the physical lanes PHLr other than the physical lane PHL to be degenerated, and outputs an enable signal LEN to enable the selected physical lane PHL.

Alternatively, the lane selection unit LSEL outputs the enable signal LEN to stop the use of the physical lane PHLs for which degeneration is specified, and which is included in the degeneration request packet DLLP which has been received in step S510. In addition, the lane selection unit LSEL selects the physical lane PHL through which data is transmitted or received to or from the information processing device PDEV of the communication destination, among the physical lanes PHL other than the physical lane PHL to be degenerated, and outputs an enable signal LEN to enable the selected physical lane PHL. Then, the frame transfer unit FTR restarts the interface unit PHY.

In addition, for example, when the operation illustrated in FIG. 13 is performed after the degeneration of the physical lane PHL is already performed, the physical lane PHL for which use has been stopped before the execution of the operation illustrated in FIG. 13 is not included in the selection target physical lane PHL. In this case, the selection target physical lane PHL is the physical lane PHL obtained by excluding the physical lanes PHL specified in step S514 or step S518 (physical lane PHL to be degenerated) from the physical lanes PHL that have been used before the execution of the operation illustrated in FIG. 13.

Further, the degeneration instruction unit DCLT outputs a notification for instructing the restart of the interface unit PHY, to the start instruction unit SCLT. Then, the start instruction unit SCLT instructs the interface unit PHY to restart, in response to, for example, the instruction of the restart from the degeneration instruction unit DCLT.

In addition, in the restart of the interface unit PHY which is performed during the degeneration of the physical lane PHL, the contents which have been set in step S522 are taken over with respect to the setting for enabling the physical lane PHL (the value of the enable signal LEN). Further, in the link-up after the restart of the interface unit PHY which is performed during the degeneration of the physical lane PHL, since the physical lane PHL to be degenerated is determined before the restart, the operation illustrated in FIG. 8 is not performed.

From the above, even when using the interface unit PHY without a function of specifying a failed lane, the frame transfer unit FTR can specify the physical lane PHLr to be degenerated after link-up, based on the reception of the degeneration lane specification request. Further, the information processing device PDEV of the request source can be notified of the information indicating the physical lane PHLr for which degeneration is specified. Alternatively, even when using the interface unit PHY without a function of specifying a failed lane, the frame transfer unit FTR can perform the degeneration of the physical lane PHLs after link-up, based on the reception of the degeneration request.

The operation after the link-up of the information processing device PDEV is not limited to this example. For example, the process of step S518 may be omitted. In this case, for example, step S512 may be repeated until the parity BIP error is detected. In addition, in step S512, if there is no physical lane PHL having the number of parity BIP errors exceeding the threshold, the frame transfer unit FTR may execute the same operations as step S318 and S320 illustrated in FIG. 11, instead of step S518.

From the above, even when using the interface unit PHY without a function of specifying a failed lane, the frame transfer unit FTR can cause the physical lane PHL to be degenerated after link-up by referring to the error information EINF or the like for indicating an error in the reception data.

For example, the frame transfer unit FTR performs the processes of detecting the trigger of lane degeneration such as steps S200 to S204 in FIG. 10, steps S302 to S304 in FIG. 11, steps S402 to S404 in FIG. 12, and steps S502 to S504 in FIG. 13, in parallel to each other. In this case, since the physical lane PHL to be degenerated is specified when any of a plurality of triggers of lane degeneration is detected, the frame transfer unit FTR can efficiently specify the physical lane PHL to be degenerated.

In addition, the frame transfer unit FTR may omit a part of the process of detecting the trigger of lane degeneration illustrated in FIG. 10 to FIG. 13. For example, the frame transfer unit FTR may omit "the number of parity BIP errors within the predetermined period exceeding the threshold" depicted in FIG. 7 from the triggers of lane degeneration. Alternatively, "deterioration of bit error", "detection of retry-out", "detection of flow control protocol error" or "switching to low power mode" may be omitted from the triggers of lane degeneration.

FIG. 14 illustrates an example of a specification method of a physical lane PHL to be degenerate, in the operation after link-up illustrated in FIGS. 10 to 13. "Presence" and "absence" which are depicted in the area of the parity BIP error illustrated in FIG. 14 are examples of a detection result of the parity BIP error when a part of period is excerpted from a predetermined period (for example, 80 milliseconds). Furthermore, a threshold for determining whether or not it is the physical lane PHL to be degenerated is, for example, "3".

In the example illustrated in FIG. 14, the total numbers of respective parity BIP errors of five PCS lanes PLr which are detected during the past 80 ms are "5", "1", "2", "4", in the respective physical lanes PHLr0, PHLr1, PHLr2, and PHLr3. For this reason, in step S206 illustrated in for example, FIG. 10, the lane selection unit LSEL specifies the physical lanes PHLr0 and PHLr3 for which the number of parity BIP errors within the predetermined period exceeds the threshold (="3"), as the lane to be degenerated. The physical lanes PHLr1 and PHLr2 are determined as the normal physical lane PHLr. Alternatively, in step S314 illustrated in FIG. 11, in step S414 illustrated in FIG. 12, and in step S514 illustrated in FIG. 13, the lane selection unit LSEL specifies the physical lane PHLr0 having the greatest number of parity BIP errors within the predetermined period, as the lane to be degenerated. The physical lanes PHLr1 to PHLr3 are determined to be the normal physical lane PHLr. In this manner, the lane selection unit LSEL specifies the physical lane PHL to be degenerated, based on the error information EINF indicating that there is an error in the data which is transferred from the information processing device PDEV of a communication destination to the interface unit PHY.

Figure 15:
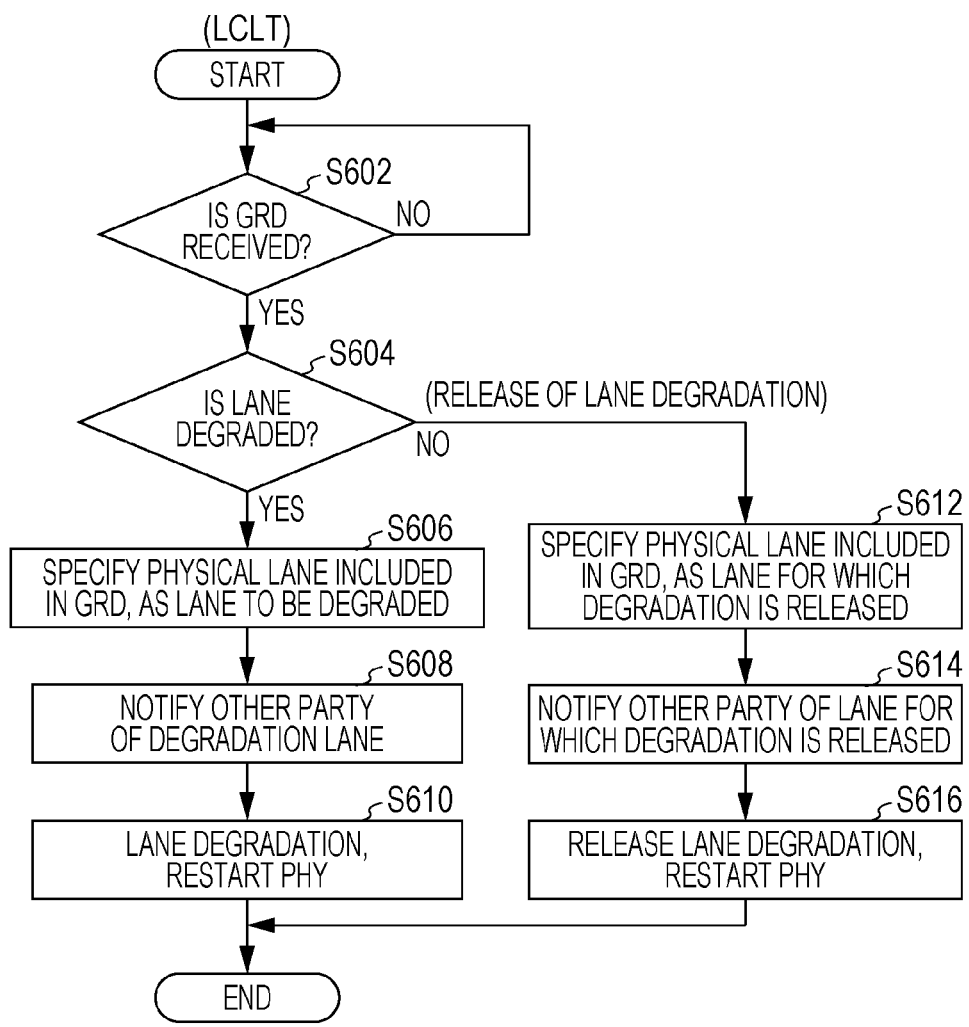
FIG. 15 is a diagram illustrating another example of the operation of the information processing device illustrated in FIG. 2.

FIG. 15 illustrates another example of the operation of the information processing device PDEV illustrated in FIG. 2. In the operation of FIG. 15, the lane degeneration or the release of lane degeneration is performed based on the reception of switching notification GRD from the CPU.

Both the information processing devices PDEV1 and PDEV2 illustrated in FIG. 2 perform the operation illustrated in FIG. 15 independently of each other. The operation illustrated in FIG. 15 is performed by the link control unit LCLT illustrated in FIG. 4 and FIG. 5. In addition, the operation illustrated in FIG. 15 may be implemented only by hardware, or may be implemented by software such as the control program performed by the CPU mounted in the frame transfer unit FTR.

In step S602, the degeneration instruction unit DCLT determines whether or not the switching notification GRD is received from the CPU mounted in the frame transfer unit FTR and the information processing device PDEV. If the switching notification GRD is received, the operation proceeds to step S604, and if the switching notification GRD is not received, the operation returns to step S602.

In step S604, the degeneration instruction unit DCLT determines whether or not information indicating the physical lane PHL to be degenerated is included in the switching notification GRD. If the information indicating the physical lane PHL to be degenerated is included in the switching notification GRD, the degeneration instruction unit DCLT notifies the lane selection unit LSEL of information indicating the physical lane PHL to be degenerated, and the operation proceeds to step S606. If the information indicating the physical lane PHL to be degenerated is not included in the switching notification GRD, information indicating an instruction to release the degenerated physical lane PHL is included in the switching notification GRD. For this reason, the degeneration instruction unit DCLT notifies the lane selection unit LSEL of information indicating an instruction to release the degenerated physical lane PHL. Then, the operation proceeds to step S612.

In addition, the information included in the switching notification GRD indicates the physical lane PHLr through which data is received from the information processing device PDEV of a communication destination or the physical lane PHLs through which data is transmitted to the information processing device PDEV of a communication destination. In addition, the information included in the switching notification GRD may indicate both the physical lanes PHLr and PHLs. The information included in the switching notification GRD is determined according to the specification of the physical lanes PHLr and PHLs to be degenerated in the low power mode. In addition, the CPU which outputs the switching notification GRD may be the CPU of onf of the information processing devices PDEV1 and PDEV2 illustrated in FIG. 2.

In step S606, the lane selection unit LSEL specifies the physical lane PHL that is included in the switching notification GRD as the physical lane PHL to be degenerated.

Next, in step S608, the frame transfer unit FTR transmits the degeneration information DINFS indicating the physical lane PHL specified in step S606 as a packet DLLP, to the information processing device PDEV of a communication destination. The link control unit LCLT of the information processing device PDEV of a communication destination outputs the enable signal LEN to stop the use of the physical lane PHL indicated by the packet DLLP (degeneration request) including the degeneration information DINFS.

Next, in step S610, in the same manner as in step S160 illustrated in FIG. 8, the link control unit LCLT outputs the enable signal LEN so as to cause the interface unit PHY to perform the lane degeneration, instructs the interface unit PHY to restart, and ends the operation.

Meanwhile, in step S612, the lane selection unit LSEL specifies the physical lane PHL that is included in the switching notification GRD, as the lane for which the degeneration is released.

Next, in step S614, the frame transfer unit FTR transmits the degeneration information DINFS indicating the physical lane PHL for which the release of the degeneration is specified in step S612 as packet DLLP, to the information processing device PDEV of the communication destination. The link control unit LCLT of the information processing device PDEV of the communication destination outputs an enable signal LEN to restart the use of the physical lane PHL indicated by the packet DLLP (degeneration request) including the degeneration information DINFS. An example in which the information processing device PDEV of the communication destination restarts the use of the physical lane PHL (in other words, release of the degeneration of the physical lane PHL) is illustrated in FIG. 16.

Next, in step S616, the link control unit LCLT performs a process for releasing the degeneration of physical lane PHL on the interface unit PHY by outputting the enable signal LEN. Further, the link control unit LCLT, in the same manner as in step S160 illustrated in FIG. 8, instructs the interface unit PHY to restart and ends the operation.

Figure 16:
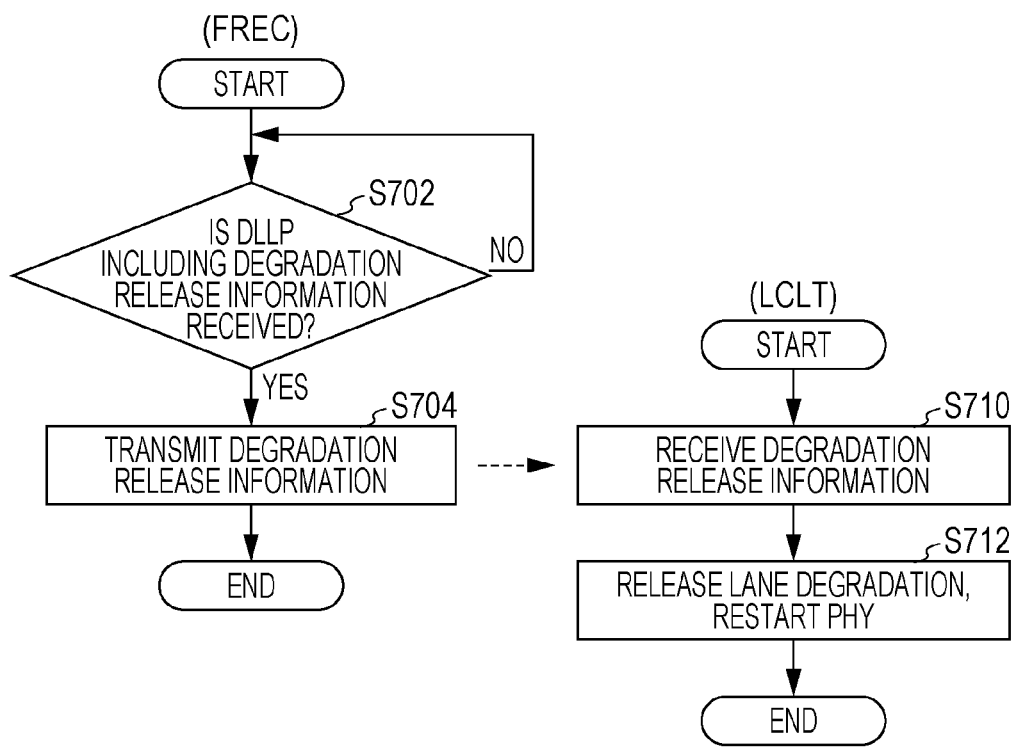
FIG. 16 is a diagram illustrating another example of the operation of the information processing device illustrated in FIG. 2.

FIG. 16 illustrates another example of the operation of the information processing device PDEV illustrated in FIG. 2. FIG. 16 illustrates an operation in which the information processing device PDEV of the communication destination receives the packet DLLP including the degeneration information DINFS indicating the degeneration of the physical lane PHL to be released and restores the degenerated physical lane PHL.

First, in step S702, the frame reception unit FREC determines whether or not to receive the control packet DLLP including the degeneration release information DINFR for releasing the degeneration. If the control packet DLLP including the degeneration release information DINFR is received, the operation of the frame reception unit FREC proceeds to step S704. Meanwhile, the control packet DLLP including the degeneration release information DINFR is not received, the operation of the frame reception unit FREC returns to step S702.

In step S704, the frame reception unit FREC outputs the control packet DLLP that has been received in step S702 to the link control unit LCLT illustrated in FIG. 4. As a result, the link control unit LCLT, in step S710, receives the control packet DLLP including the degeneration release information DINFR. The link control unit LCLT starts the process of restarting the use of the degenerated physical lane PHL.

Next, in step S712, the link control unit LCLT releases the degeneration of the degenerated physical lane PHL based on the degeneration release information DINFR, and instructs the interface unit PHY to restart. For example, the lane selection unit LSEL outputs the enable signal LEN corresponding to the physical lane PHL for which the degeneration is released. Then, the operation for releasing the degeneration of the physical lane PHL is ended.

Figure 17:
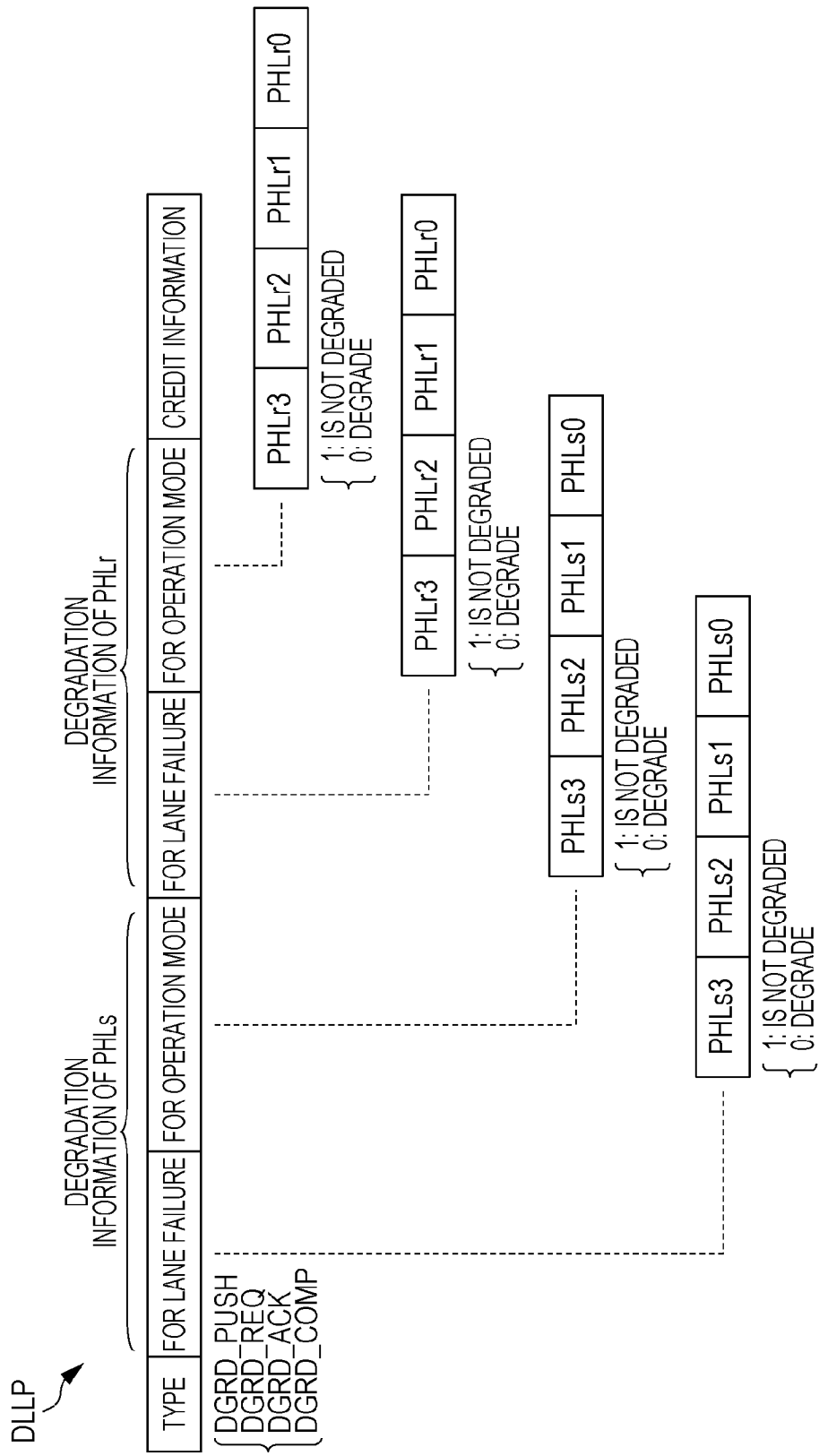
FIG. 17 is a diagram illustrating an example of a degeneration control packet used for lane degeneration and for releasing a degenerated lane.

FIG. 17 illustrates an example of the degeneration control for packet DLLP to be used to release the lane degeneration and degeneration lane. The degeneration control packet DLLP has an area for storing the type of packet DLLP, degeneration information on the physical lane PHLs on the transmission side, degeneration information on the physical lane PHLr on the reception side, and credit information indicating a free space of the buffer unit RBUF.

The degeneration information on the physical lane PHLs on the transmission side and the degeneration information on the physical lane PHLr on the reception side are determined with the information processing device PDEV that transmits the degeneration control packet DLLP as a reference. For example, when the information processing device PDEV transmits the degeneration control packet DLLP instructing the degeneration of the physical lane PHLr through which data is received, to the information processing device PDEV of a communication destination, the degeneration information is stored in the area of the physical lane PHLr on the reception side.

Figure 18:
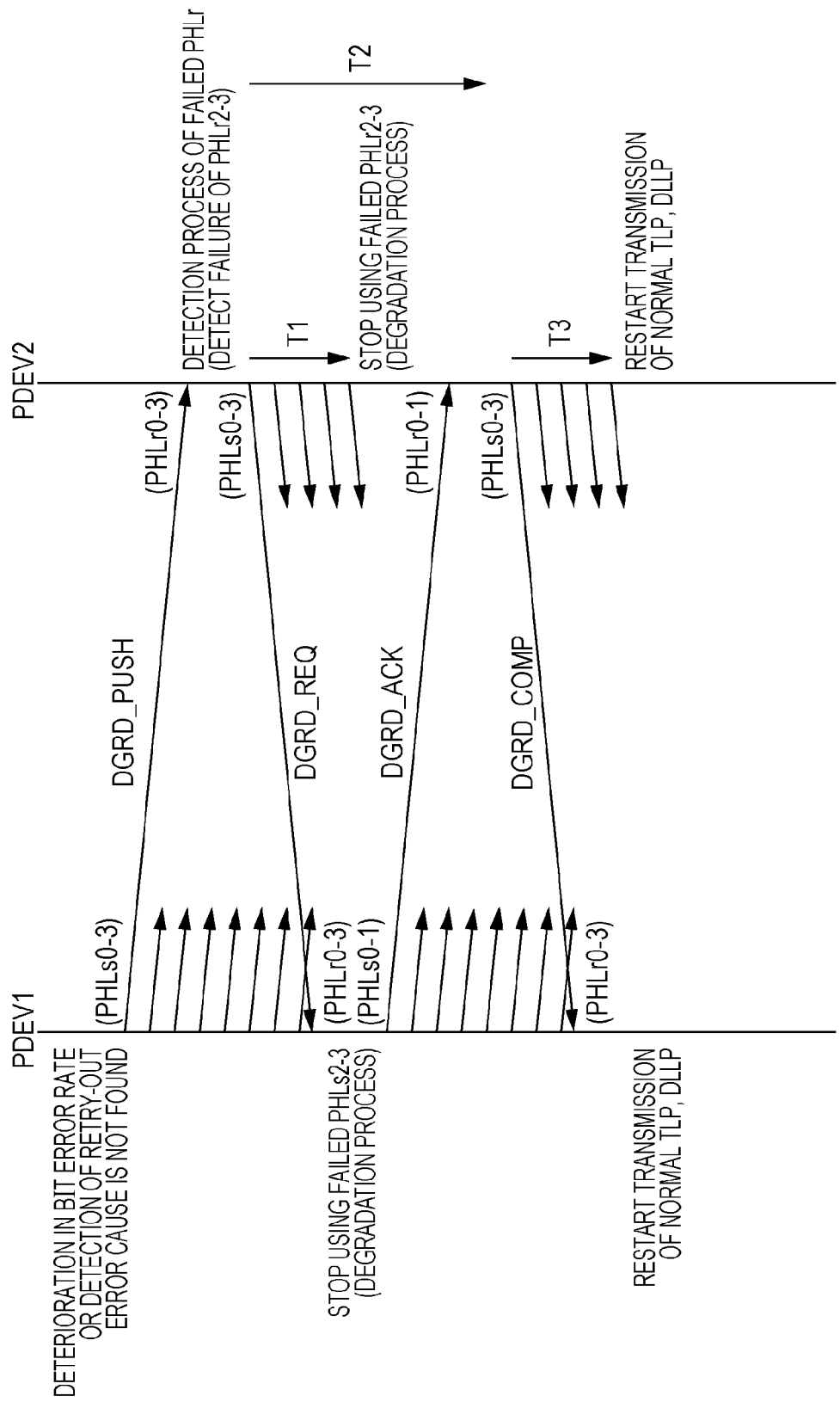
FIG. 18 is a diagram illustrating an example of an operation of the information processing system, when a request for specification of degeneration of a physical lane is made to an information processing device of a communication destination (degenerated lane specification request).

The area of the type of the packet DLLP stores any of information pieces for identifying commands DGRD_PUSH, DGRD_REQ, DGRD_ACK, and DGRD_COMP illustrated in FIG. 18. The command DGRD_PUSH is used to make a request for the specification of the physical lane PHLs to be degenerated, to the information processing device PDEV of a communication destination (degeneration lane specification request). The command DGRD_REQ is used to make a request for the degeneration of the physical lane PHLs, to the information processing device PDEV of a communication destination (degeneration request). In addition, the command DGRD_REQ is used to make a request for the degeneration of the physical lane PHL, to the information processing device PDEV of a communication destination, in order to switch the operation mode from the normal operation mode to the low power mode. In addition, the command DGRD_REQ is used to make a request for the release of the degeneration of the physical lane PHL, to the information processing device PDEV of a communication destination, in order to switch the operation mode from the low power mode to the normal operation mode.

Figure 19:
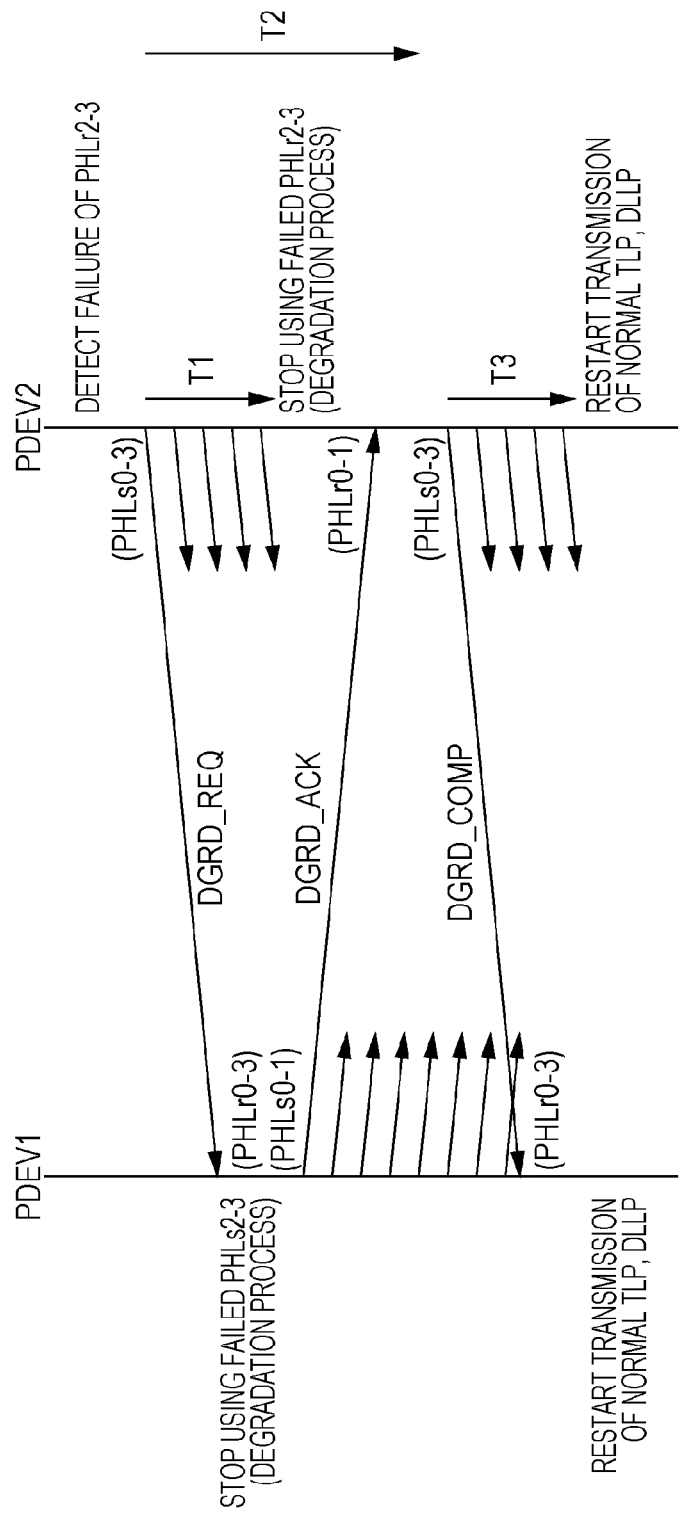
FIG. 19 is a diagram illustrating an example of an operation of the information processing system, when an information processing device that has detected a failure in a physical lane notifies the information processing device of the communication destination of degeneration of a physical lane (degeneration request).
Figure 20:
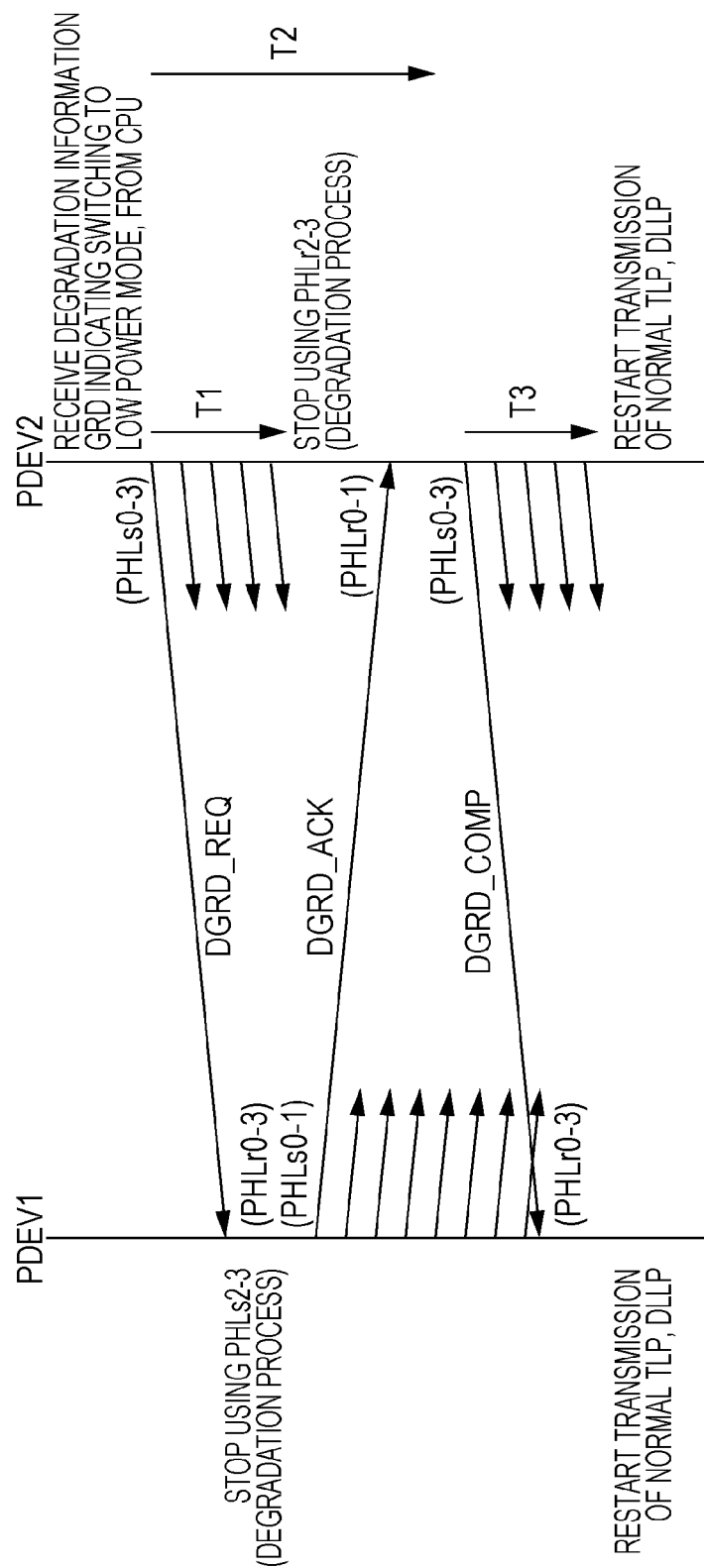
FIG. 20 is a diagram illustrating an example of an operation of the information processing system that causes a physical lane to be degenerated based on reception of degeneration information indicating switching to a low power mode.
Figure 21:
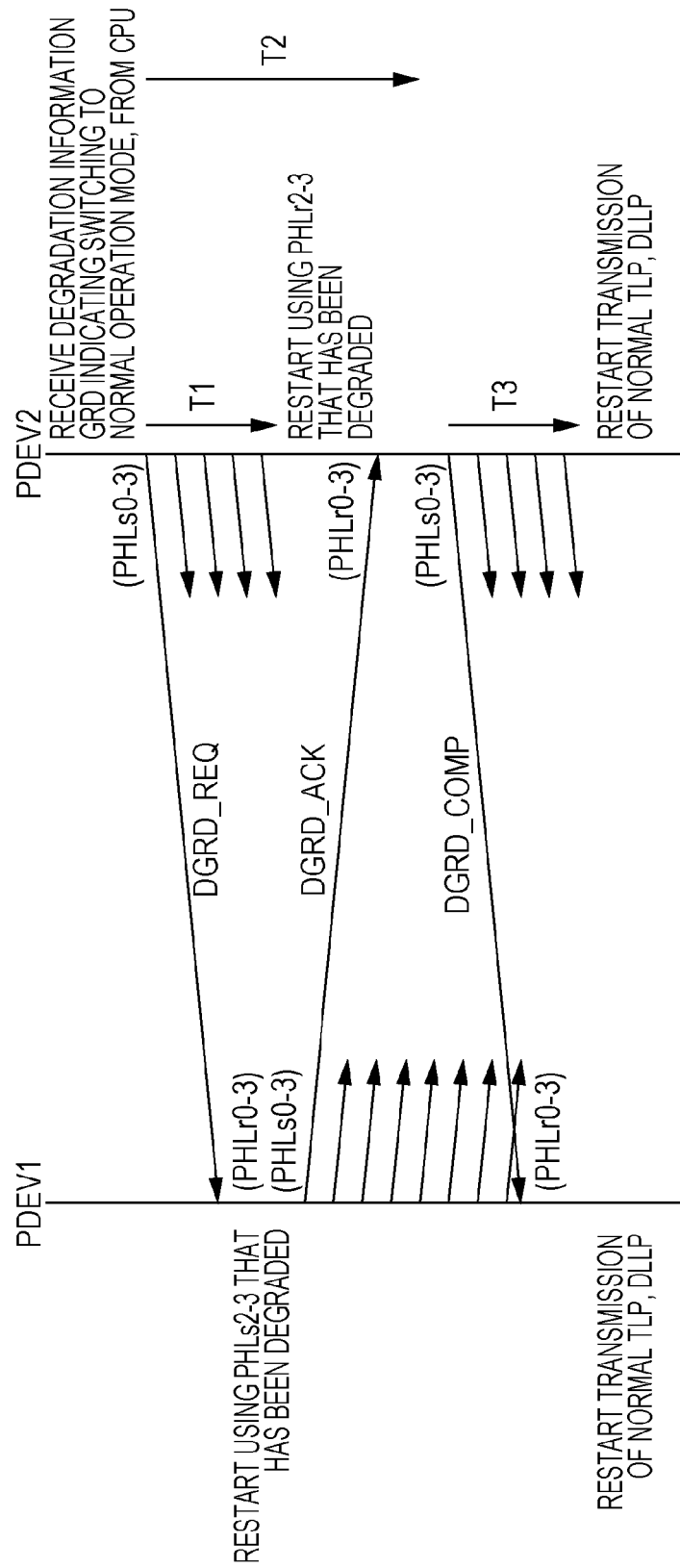
FIG. 21 is a diagram illustrating an example of an operation of the information processing system that releases the degeneration of a physical lane based on reception of degeneration information indicating switching to a normal operating mode.

The command DGRD_ACK is used to notify the information processing device PDEV of the issuer of the command DGRD_REQ of the completion of the degeneration or the completion of the release of degeneration of the physical lane PHL. The command DGRD_COMP is used to notify the information processing device PDEV of the issuer of the command DGRD_ACK of the response of the reception of the command DGRD_ACK. Examples of the use of the commands DGRD_PUSH, DGRD_REQ, DGRD_ACK, and DGRD_COMP are illustrated in FIG. 19 to FIG. 21.

The degeneration information area of the physical lane PHLs has a degeneration information area for lane failure, with an element as a failure in the physical lane PHL, and a degeneration information area for an operation mode, with an element as an operation mode (low power mode). Each degeneration information area has a flag area in which logic 0 is set for degeneration and logic 1 is set for non-degeneration, for each of the physical lanes PHLs0 to PHLs3.

The degeneration information area of the physical lane PHLr on the reception side has a degeneration information area for a lane failure, with an element as a failure in the physical lane PHL, and a degeneration information area for an operation mode, with an element as an operation mode (low power mode). Each degeneration information area has a flag area in which logic 0 is set for degeneration and logic 1 is set for non-degeneration, for each of the physical lanes PHLr0 to PHLr3. The cause of a failure in the physical lane PHL includes a failure in the PCS lane PL corresponding to each physical lane PHL, and a failure in circuits and components connected to the physical lane PHL or the PCS lane PL, in addition to the failure in the physical lane PHL itself.

In addition, the degeneration information area, with an element as a failure in the physical lane PHL, and the degeneration information area, with an element as an operation mode (low power mode) may be shared in the degeneration information area of the physical lane PHLs on the transmission side and the degeneration information area of the physical lane PHLr on the reception side. Further, the degeneration control packet DLLP may not include an area for storing credit information.

FIG. 18 illustrates an example of an operation of the information processing system SYS1 when making a request for specification of a degenerated physical lane PHLs to the information processing device PDEV of a communication destination (degenerated lane specification request). FIG. 18 illustrates an example in which the information processing device PDEV1 illustrated in FIG. 2 issues a degeneration lane specification request to the information processing device PDEV2. In addition, when the information processing device PDEV2 issues a degeneration lane specification request to the information processing device PDEV1, the same operation as in FIG. 18 is performed. In the following description, the degeneration control packet DLLP using commands DGRD_PUSH, DGRD_REQ, DGRD_ACK or DGRD_COMP are referred to as commands DGRD_PUSH, DGRD_REQ, DGRD_ACK or DGRD_COMP.

For example, although deterioration in a bit error rate or retry-out is determined, when the number of BIP errors does not exceed the threshold and the cause of an error is not found, the information processing device PDEV1 transmits the command DGRD_PUSH to the information processing device PDEV2. For example, a dummy value (for example, logic 1) is stored in the degeneration information area of the physical lane PHLs and the degeneration information area of the physical lane PHLr which are included in the packet DLLP of the command DGRD_PUSH (FIG. 17). The command DGRD_PUSH is repeatedly transmitted until the command DGRD_PUSH is received from the information processing device PDEV2. For example, the command DGRD_PUSH is transmitted in step S318 illustrated in FIG. 11.

Next, the information processing device PDEV2 that has received the command DGRD_PUSH detects, for example, a failure in the physical lanes PHLr2 to PHLr3, by comparing the number of parity BIP errors of the physical lane PHLr through which data is received from the information processing device PDEV1 with a threshold. The example of the operation of the information processing device PDEV2 that receives the command DGRD_PUSH is illustrated in steps S512, S514, and S518 of FIG. 13 (a process of degeneration lane specification request). In addition, the information processing device PDEV2 ignores the reception of the second and subsequent command DGRD_PUSH.

The information processing device PDEV2 notifies the information processing device PDEV1 of information indicating the detected physical lanes PHLr2 and PHLr3, using the command DGRD_REQ. The command DGRD_REQ is repeatedly transmitted until a predetermined time T1 has elapsed. For example, logic "1" indicating no degeneration is stored in an area indicating the physical lanes PHLr0 and PHLr1, in the degeneration information area of the physical lane PHLr which is included in the packet DLLP (FIG. 17) of the command DGRD_REQ. Logic "0" indicating degeneration is stored in an area indicating the physical lanes PHLr2 and PHLr3. Meanwhile, a dummy (for example, information indicating the current degeneration situation) is stored in the degeneration information area of the physical lane PHLs included in the packet DLLP of the command DGRD_REQ (FIG. 17).

In addition, the information processing device PDEV2 starts measuring the predetermined time T2, based on the transmission of command DGRD_REQ. The predetermined time T2 is a limit time until the command DGRD_ACK is received. After repeating the transmission of command DGRD_REQ until a predetermined time T1 has elapsed, the information processing device PDEV2 generates an enable signal LEN corresponding to the failure-detected physical lanes PHLr2 and PHLr3. Then, the information processing device PDEV2 performs the degeneration process of stopping the use of the failure-detected physical lanes PHLr2 and PHLr3.

For example, the information processing device PDEV2 performs the operation illustrated in FIG. 10, based on the reception of the command DGRD_PUSH, and the detection of a failure in the physical lane PHLr, the degeneration of the physical lane PHLr, and an operation of notifying the information processing device PDEV1 of the degenerated physical lane PHLr. Step S208 in FIG. 10 is performed using the command DGRD_REQ.

The information processing device PDEV1 that has received the command DGRD_REQ ends the transmission of the command DGRD_PUSH. The information processing device PDEV1 detects the physical lanes PHLr2 and PHLr3 for which use is stopped by the information processing device PDEV2, from the information that is included in the command DGRD_REQ. Then, the information processing device PDEV1 performs a degeneration process of stopping the use of physical lanes PHLs2 and PHLs3 corresponding to the physical lanes PHLr2 and PHLr3 for which use is stopped by the information processing device PDEV2.

The information processing device PDEV1 restarts the interface unit PHY after the degeneration process, and transmits the command DGRD_ACK indicating the completion of the degeneration process to the information processing device PDEV2, by using the physical lanes PHLr0-PHLr1 that continue to be used, after the restart completion. The command DGRD_ACK is repeatedly transmitted from the information processing device PDEV2 until it receives a command DGRD_COMP. For example, a dummy value (for example, information indicating the current degeneration state) is stored in the degeneration information area of the physical lane PHLs and the degeneration information area of the physical lane PHLr, which are included in the packet DLLP (FIG. 17) of the command DGRD_ACK. The degeneration process of the physical lane PHLr by the information processing device PDEV1 and the restart process of the interface unit PHY are performed by step S522 illustrated in FIG. 13.

The information processing device PDEV2 that has received the command DGRD_ACK transmits the command DGRD_COMP indicating the completion of the degeneration process, to the information processing device PDEV1. In addition, a failure is not detected in the physical lanes PHLs0 to PHLs3 through which data is transmitted from the information processing device PDEV2 to the information processing device PDEV1. For this reason, the information processing device PDEV2 transmits the command DGRD_COMP, using all of the physical lanes PHLs0 to PHLs3. The command DGRD_COMP is repeatedly transmitted, until a predetermined time T3 has elapsed. For example, a dummy value (for example, information indicating the current degeneration state) is stored in the degeneration information area of the physical lane PHLs and the degeneration information area of the physical lane PHLr, which are included in the packet DLLP (FIG. 17) of the command DGRD_COMP.

The information processing device PDEV2 that has completed the transmission of the command DGRD_COMP restarts the transmission of a normal packet (transaction layer packet: TLP) and a control packet DLLP. Similarly, the information processing device PDEV1 that has received the command DGRD_COMP restarts the transmission of the normal packet TLP and the control packet DLLP.

In addition, the information processing device PDEV2 may execute a degeneration process of stopping the use of the failure-detected physical lanes PHLr2 and PHLr3, and the physical lanes PHLs2 and PHLs3 on the transmission side corresponding to the physical lanes PHLr2 and PHLr3, after elapse of a predetermined time T1. In this case, the information processing device PDEV1 that has received the command DGRD_REQ performs the degeneration process of stopping the use of the physical lanes PHLr2 and PHLr3 corresponding to the physical lanes PHLs2 and PHLs3 for which use is stopped. Then, the command DGRD_COMP is transmitted using the physical lanes PHL0 and PHL1 other than the degenerated physical lanes PHL2 and PHL3.

FIG. 19 illustrates an example of an operation of the information processing system SYS1 when the information processing device PDEV that has detected a failure of the physical lane PHLr notifies the information processing device PDEV of the communication destination of the physical lane PHLr to be degenerated (degeneration request). With respect to the operation which is the same as or similar to FIG. 18, the detailed description thereof is omitted.

FIG. 19 illustrates an example in which the information processing device PDEV2 illustrated in FIG. 2 detects the number of BIP error exceeding the threshold and issues a degeneration request of the physical lane PHLs to the information processing device PDEV1. In addition, even if the information processing device PDEV1 issues a degeneration request to the information processing device PDEV2, the same operation as in FIG. 19 is performed.

The operation illustrated in FIG. 19 is started, for example, when the information processing device PDEV2 detects a failure in the physical lanes PHLr2 and PHLr3. The detection of the failure in the physical lanes PHLr2 and PHLr3 is performed by step S206 illustrated in FIG. 10, step S314 illustrated in FIG. 11, and steps S414 and S418 illustrated in FIG. 12. The operation illustrated in FIG. 19 is similar to the operation illustrated in FIG. 18, excluding the command DGRD_PUSH.

In addition, also in FIG. 19, in the same manner as in FIG. 18, the information processing device PDEV2 may perform the degeneration process of stopping the use of the physical lanes PHLs2 and PHLs3 on the transmission side corresponding to the failure-detected physical lanes PHLr2 and PHLr3, after the elapse of the predetermined time T1. In this case, the information processing device PDEV1 that has received the command DGRD_REQ performs the degeneration process of stopping the use of the physical lanes PHLr2 and PHLr3 on the reception side corresponding to the physical lanes PHLs2 and PHLs3 for which use has been stopped. Then, the command DGRD_COMP is transmitted using physical lanes PHL0 and PHL1 excluding the degenerated physical lanes PHL2 and PHL3.

FIG. 20 illustrates an example of the operation of the information processing system SYS1 to degeneration of the physical lane PHL based on reception of a switching notification GRD indicating the switching to the low power mode. With respect to the operation which is the same as or similar to FIG. 18, the detailed description thereof is omitted. FIG. 20 illustrates an example in which the CPU of the information processing device PDEV2 illustrated in FIG. 2 outputs the switching notification GRD. In addition, even when the CPU of the information processing device PDEV1 outputs the switching notification GRD, the same operation as in FIG. 20 is performed.

The operation illustrated in FIG. 20 is started by the information processing device PDEV2 receiving the switching notification GRD indicating the switching from the normal operation mode to the low power mode, from the CPU. For example, the switching notification GRD contains information for stopping the use of the physical lanes PHLr2 and PHLr3 through which data is received from the information processing device PDEV of a communication destination. The operation illustrated in FIG. 20 is performed by steps S606 to S610 illustrated in FIG. 15. The operation illustrated in FIG. 20 is similar to the operation obtained by excluding the command DGRD_PUSH from the operation illustrated in FIG. 18, except that the operation is performed based on the switching of the operation mode rather than a failure.

In addition, the information processing device PDEV2 may stop the use of the physical lane PHLs through which data is transmitted to the information processing device PDEV of the communication destination, based on the switching notification GRD from the CPU. In addition, the information processing device PDEV2 may stop the use of the physical lane PHLr and the physical lane PHLs, based on the switching notification GRD.

If the use of the physical lanes PHLr and PHLs is stopped, similar to FIG. 18, the information processing device PDEV2 performs the degeneration process of stopping the use of the physical lanes PHLr2 and PHLr3 and the physical lanes PHLs2 and PHLs3, after elapse of the predetermined time T1. In this case, the information processing device PDEV1 that has received the command DGRD_REQ performs the degeneration process of stopping the use of the physical lanes PHLr2 and PHLr3 corresponding to the physical lanes PHLs2 and PHLs3 for which use has been stopped. Then, the command DGRD_COMP is transmitted using the physical lanes PHL0 and PHL1 excluding the degenerated physical lanes PHL2 and PHL3.

FIG. 21 illustrates an example of the operation of the information processing system SYS1 for releasing the degeneration of the physical lane PHL based on reception of a switching notification GRD indicating the switching to the normal operation mode. With respect to the operation which is the same as or similar to FIG. 18, the detailed description thereof is omitted. FIG. 21 illustrates an example in which the CPU of the information processing device PDEV2 illustrated in FIG. 2 outputs the switching notification GRD. In addition, even when the CPU of the information processing device PDEV1 outputs the switching notification GRD, the same operation as in FIG. 21 is performed.

The operation illustrated in FIG. 21 is started by the information processing device PDEV2 receiving the switching notification GRD indicating the switching from the low power mode to the normal operation mode, from the CPU. For example, the switching notification GRD contains information for restarting the use of the degenerated physical lanes PHLr2 and PHLr3. The operation illustrated in FIG. 21 is performed by steps S612 to S616 illustrated in FIG. 15. The operation illustrated in FIG. 21 is similar to the operation obtained by excluding the command DGRD_PUSH from the operation illustrated in FIG. 18, except that the physical lane PHL to be used and the physical lane PHL for which use is to be stopped are different from each other.

In addition, when the information processing device PDEV2 in FIG. 20 stops the use of the physical lane PHLs based on the reception of the switching notification GRD, in FIG. 21, the information processing device PDEV2 may restart the use of the physical lane PHLs for which use has been stopped based on the switching notification GRD. In addition, a specification is assumed in which the information processing device PDEV2 stops the use of both the physical lanes PHLr and PHLs, based on the reception of the switching notification GRD. In this case, in FIG. 21, the information processing device PDEV2 may restart the use of both the physical lanes PHLr and PHLs for which use has been stopped, based on the switching notification GRD.

If the use of both the physical lanes PHLr and PHLs is stopped in FIG. 20, the information processing device PDEV2 restarts the use of the physical lanes PHLr2 and PHLr3 and the physical lanes PHLs2 and PHLs3, after elapse of the predetermined time T1. In this case, the information processing device PDEV1 that has received the command DGRD_REQ restarts the use of the physical lanes PHLs2 and PHLs3 and the physical lanes PHLr2 and PHLr3.

From the above, even in the embodiments illustrated in FIG. 2 to FIG. 21, similarly to the embodiment illustrated in FIG. 1, without adding a new function to the interface unit PHY, it is possible to specify the physical lane PHLr for which use has been stopped, and to stop the use of the specified physical lane PHLr. At this time, the information processing device PDEV which has caused the physical lane PHLr to be degenerated transmits the frame data SFRAM including the degeneration information DINFS indicating the physical lane PHLr for which use has been stopped, to the information processing device PDEV of a communication destination. Thus, the information processing device PDEV of a communication destination can also stop the use of the physical lane PHLs corresponding to the error-detected physical lane PHLr.

Furthermore, in the embodiments illustrated in FIG. 2 to FIG. 21, a plurality of information processing devices PDEV cause the physical lane PHL to be degenerated with each other, using the commands DGRD_PUSH, DGRD_REQ, DGRD_ACK, and DGRD_COMP. Thus, based on the information indicating the degenerated physical lane PHL in one information processing device PDEV, the other information processing device PDEV can cause the physical lane PHL to be degenerated corresponding to the degenerated physical lane PHL. Since the commands DGRD_PUSH, DGRD_REQ, DGRD_ACK, and DGRD_COMP are included in the frame data RFRAM and RFRAM, the interface unit PHY does not concern the contents of the frame data RFRAM and RFRAM. Thus, without adding a new function to the interface unit PHY, a plurality of information processing devices PDEV can cause the physical lane PHL to be degenerated with each other.

For example, during the start process before link-up of the information processing device PDEV, a plurality of information processing devices PDEV can cause the physical lane PHL to be degenerated with each other based on the detection/non-detection of the alignment marker AM. After the link-up of the information processing device PDEV, a plurality of information processing devices PDEV can cause the physical lane PHL to be degenerated with each other, based on the detection of the fault in the retransmission process of a packet (detection of deterioration in bit error rate or retry-out). After the link-up of the information processing device PDEV, a plurality of information processing devices PDEV can cause the physical lane PHL to be degenerated with each other, based on the detection of the flow control protocol error. Before and after the link-up of the information processing device PDEV, a plurality of information processing devices PDEV can cause the physical lane PHL to be degenerated and the degeneration to be released with each other, based on the switching of the operation mode of the information processing system SYS1.

In addition, in the embodiments illustrated in FIG. 2 to FIG. 21, if the number of parity BIP errors within predetermined period exceeds the threshold, the use of the error-detected physical lane PHLr (reception side) is stopped, and the use of the physical lane PHLs (transmission side) of the information processing device PDEV of a communication destination is stopped. However, if the number of parity BIP errors within predetermined period exceeds a threshold, after stopping the use of the error-detected physical lane PHLr (reception side), the use of physical lane PHLs on the transmission side may be stopped. In this case, the information processing device PDEV of a communication destination sequentially stops the use of the physical lane PHLs on the transmission side and the physical lane PHLr on the reception side, based on the notification of the degeneration lane from the information processing device PDEV of the communication source.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
an arithmetic processing device;
a storage device configured to store data processed by the arithmetic processing device, the storage device being coupled to the arithmetic processing device; and
a communication device coupled to the arithmetic processing device, and the communication device being configured to:
output transmission information including transmission data which is output from the arithmetic processing device, and output reception data included in reception information to the arithmetic processing device,
distribute the transmission information into a plurality of pieces of distribution transmission data, transmit the plurality of pieces of distribution transmission data to a plurality of first lanes, respectively, the reception information being generated from a plurality of pieces of distribution reception data that are respectively received through a plurality of second lanes,
extract the reception data included in the reception information, and first error information indicating an error in any of the plurality of first lanes included in the reception information,
generate first degeneration information indicating a use stop lane for which use is stopped, among the plurality of first lanes, based on the first error information,
generate second degeneration information indicating a use stop lane for which use is stopped, among the plurality of second lanes, based on second error information, and generate transmission information including the second degeneration information,
transmit distribution transmission data of the transmission information that correspond to lanes excluding the use stop lane indicated by the first degeneration information, among the plurality of first lanes, generate the reception information in correspondence with distribution reception data that is received through lanes excluding the use stop lane indicated by the second degeneration information, among the plurality of second lanes, and detect an error in any of the plurality of pieces of distribution reception data, wherein the second error information is generated to indicate a second lane through which error-detected distribution reception data is transmitted.

2. The information processing device according to claim 1, wherein the transmission information and the reception information has a predetermined number of packets which is a transmission unit of data, wherein the communication device repeatedly transmits a packet containing the second degeneration information to an information processing device of a communication destination, during a first predetermined period, stops using the use stop lane indicated by the second degeneration information, among the plurality of second lanes, after elapse of the first predetermined period, when receiving a packet containing stop notification information indicating that the use of the use stop lane indicated by the second degeneration information has been stopped, from the information processing device of the communication destination that has received the packet containing the second degeneration information, repeatedly transmits a packet containing stop completion information indicating that the stop notification information has been received, during a second predetermined period, to the information processing device of the communication destination, and restarts transmission of the transmission data, after elapse of the second predetermined period.

3. The information processing device according to claim 1, wherein the communication device generates transmission information including degeneration lane specification request information instructing an information processing device of a communication destination to detect a failure in any of the plurality of first lanes and to stop using the failure-detected first lane, wherein after transmitting the transmission information including the degeneration lane specification request information, upon receipt of reception information including failure information indicating a failure in any of the plurality of first lanes, from the information processing device of the communication destination, wherein the communication device outputs degeneration information indicating the first lane indicated by the failure information wherein use of the first lane indicated by the degeneration information is stopped.

4. The information processing device according to claim 1, wherein when the communication device receives a switching notification for switching an operation mode to a low power mode, from the arithmetic processing device, the communication device:

generates transmission information containing degeneration lane specification request information instructing an information processing device of a communication destination to stop using a predetermined lane among the plurality of first lanes and the plurality of second lanes, based on the switching notification, and outputs at least any one of the first degeneration information and the second degeneration information indicating the predetermined lane, wherein use of the predetermined lane indicated by the first degeneration information is stopped at a transmission source, and use of the predetermined lane indicated by the second degeneration information is stopped at the communication destination.

5. The information processing device according to claim 3, wherein the transmission information and the reception information has a predetermined number of packets which is a transmission unit of data, and wherein the communication device repeatedly transmits a packet containing the degeneration lane specification request information to the information processing device of the communication destination, until reception of the failure information, repeatedly transmits a packet containing stop notification information indicating that the use of a first lane indicated by the degeneration information has been stopped, to the information processing device of the communication destination, until reception of a packet containing stop completion information indicating reception of the stop notification information from the information processing device of the communication destination, and restarts transmitting the transmission data, based on the reception of the packet containing the stop completion information.

6. The information processing device according to claim 4, wherein the transmission information and the reception information has a predetermined number of packets which is a transmission unit of data, and wherein the communication device repeatedly transmits a packet containing the degeneration lane specification request information to the information processing device of the communication destination during a first predetermined period, stops using the predetermined lane indicated by the first degeneration information and the second degeneration information, after elapse of the first predetermined period, when receiving a packet containing stop notification information indicating that the use of the predetermined lane has been stopped, from the information processing device of the communication destination that has received a packet containing the degeneration lane specification request information, repeatedly transmits a packet containing stop completion information indicating that the stop notification information has been received, to the information processing device of the communication destination, during a second predetermined period, and restarts transmission of transmission data, after elapse of the second predetermined period.

7. The information processing device according to claim 4, wherein when upon receipt of the switching notification for releasing the low power mode from the arithmetic processing device, the communication device generates transmission information including degeneration lane specification request information instructing the information processing device of the communication destination to restart using the predetermined lane, based on the switching notification, and outputs at least any one of first degeneration information and second degeneration information indicating restart of the use of the predetermined lane that has been stopped, wherein use of the predetermined lane indicated by the first degeneration information is restarted at the transmission source, and use of the predetermined lane indicated by the second degeneration information is restarted at the communication destination.

8. The information processing device according to claim 7, wherein the transmission information and the reception information has a predetermined number of packets of which each is a transmission unit of data, and wherein the communication device repeatedly transmits a packet containing the degeneration lane specification request information to the information processing device of the communication destination during a first predetermined period, restarts using the predetermined lane indicated by the first degeneration information and the second degeneration information, after elapse of the first predetermined period, when receiving a packet containing restart notification information indicating that the use of the predetermined lane has been restarted, from the information processing device of the communication destination that has received a packet containing the degeneration lane specification request information, repeatedly transmits a packet containing restart completion information indicating that the restart notification information has been received, to the information processing device of the communication destination, during the second predetermined period, and restarts transmission of transmission data, after elapse of the second predetermined period.

9. An information processing system comprising:

a plurality of information processing devices which are connected with each other through a plurality of first lanes and a plurality of second lanes, wherein at least one of the plurality of information processing devices including:

an arithmetic processing device, a storage device configured to store data processed by the arithmetic processing device, and the storage device being coupled to the arithmetic processing device, a communication device coupled to the arithmetic processing device, and the communication device configured to:

output transmission information including transmission data which is output from the arithmetic processing device, and output reception data included in reception information to the arithmetic processing device, distribute the transmission information into a plurality of pieces of distribution transmission data, transmit the plurality of pieces of distribution transmission data to a plurality of first lanes, respectively, the reception information being generated from a plurality of pieces of distribution reception data that are respectively received through a plurality of second lanes, extract the reception data included in the reception information, and first error information indicating an error in any of the plurality of first lanes included in the reception information;

generate first degeneration information indicating a use stop lane for which use is stopped, among the plurality of first lanes, based on the first error information, generate second degeneration information indicating a use stop lane for which use is stopped, among the plurality of second lanes, based on second error information, and generate transmission information including the second degeneration information, transmit distribution transmission data of the transmission information that correspond to lanes excluding the use stop lane indicated by the first degeneration information, among the plurality of first lanes;

generate the reception information in correspondence with distribution reception data that is received through lanes excluding the use stop lane indicated by the second degeneration information, among the plurality of second lanes; and detect an error in any of the plurality of pieces of distribution reception data, wherein the second error information is generated to indicate a second lane through which error-detected distribution reception data is transmitted.

10. A communication device which is mounted in an information processing device including an arithmetic processing device and a storage device configured to store data processed by the arithmetic processing device, the communication device comprising:

one or more processor to:

output transmission information including transmission data which is output from the arithmetic processing device, and output reception data included in reception information to the arithmetic processing device, distribute the transmission information into a plurality of pieces of distribution transmission data, transmit the plurality of distribution transmission data to a plurality of first lanes, respectively, the reception information being generated from a plurality of pieces of distribution reception data that are respectively received through a plurality of second lanes, extract the reception data included in the reception information, and first error information indicating an error in any of the plurality of first lanes included in the reception information;

generate first degeneration information indicating a use stop lane for which use is stopped, among the plurality of first lanes, based on the first error information, generate second degeneration information indicating a use stop lane for which use is stopped, among the plurality of second lanes, based on second error information, and generate transmission information including the second degeneration information, transmit distribution transmission data of the transmission information that correspond to lanes excluding the use stop lane indicated by the first degeneration information, among the plurality of first lanes, generate the reception information in correspondence with distribution reception data that is received through lanes excluding the use stop lane indicated by the second degeneration information, among the plurality of second lanes, and detect an error in any of the plurality of pieces of distribution reception data, wherein the second error information is generated to indicate a second lane through which error-detected distribution reception data is transmitted.

\* \* \* \* \*